United States Patent
Roth et al.

(10) Patent No.: US 7,040,443 B1
(45) Date of Patent: May 9, 2006

(54) MOTORIZED SCOOTER

(75) Inventors: David Roth, Los Angeles, CA (US); Lawrence Diener, Long Beach, CA (US); David R. Goetz, Los Angeles, CA (US)

(73) Assignee: Go Sporting Goods, LLC, Rowland Heights, CA (US)

( * ) Notice: Subject to any disclaimer, the term of this patent is extended or adjusted under 35 U.S.C. 154(b) by 0 days.

(21) Appl. No.: 10/634,579

(22) Filed: Aug. 4, 2003

(51) Int. Cl.
 *B62M 1/20* (2006.01)
(52) U.S. Cl. .................. 180/221; 180/220; 180/65.1; 180/68.5
(58) Field of Classification Search ........... 180/219, 180/220, 221, 68.5, 65.1; 280/87.01, 87.041, 280/79.11; 318/139
 See application file for complete search history.

(56) References Cited

U.S. PATENT DOCUMENTS

| | | | |
|---|---|---|---|
| 2,414,275 A | 1/1947 | Schwinn | 74/551.4 |
| 3,891,044 A * | 6/1975 | Tiede | 180/222 |
| 3,990,717 A | 11/1976 | Best | 280/278 |
| 4,044,851 A | 8/1977 | Shaw et al. | 180/206 |
| 4,361,057 A | 11/1982 | Kochera | 74/551.4 |
| 4,611,818 A | 9/1986 | Cammarata | 280/278 |
| 4,821,832 A | 4/1989 | Patmont | 180/208 |
| 5,735,363 A | 4/1998 | Horovitz et al. | 180/205 |
| 5,775,452 A * | 7/1998 | Patmont | 180/181 |
| 5,848,660 A | 12/1998 | McGreen | 180/206 |
| 5,853,058 A * | 12/1998 | Endo et al. | 180/65.1 |
| 6,220,379 B1 * | 4/2001 | Schugt et al. | 180/65.1 |
| 6,227,324 B1 | 5/2001 | Sauve | 180/228 |
| 6,234,501 B1 | 5/2001 | Chen | 280/87.041 |
| 6,270,095 B1 | 8/2001 | Chang | 280/87.041 |
| 6,283,485 B1 | 9/2001 | Tsai | 280/87.05 |
| 6,332,621 B1 | 12/2001 | Wu | 280/87.041 |
| 6,343,667 B1 | 2/2002 | Sauve | 180/181 |
| 6,345,678 B1 | 2/2002 | Chang | 180/228 |
| 6,431,302 B1 | 8/2002 | Patmont et al. | 180/228 |
| 2001/0011202 A1 * | 8/2001 | Yamawaki | 701/93 |
| 2002/0000339 A1 * | 1/2002 | Tsai | 180/65.1 |
| 2003/0029652 A1 * | 2/2003 | Lan | 180/65.2 |
| 2004/0216929 A1 * | 11/2004 | White | 180/2.2 |

FOREIGN PATENT DOCUMENTS

DE 4240439 A1 * 6/1994

* cited by examiner

*Primary Examiner*—Lesley D. Morris
*Assistant Examiner*—Daniel Yeagley
(74) *Attorney, Agent, or Firm*—Jeffer, Mangels, Butler & Marmaro LLP

(57) ABSTRACT

A scooter having a fuselage with a front portion and a rear portion that includes a rear wheel rotatably mounted at the rear portion. The scooter also includes a standing platform supported by the fuselage for supporting a rider and a transmission system mounted under the standing platform in the rear portion of the fuselage. The transmission system having a motor with a wheel engagement element being operatively coupled with the rear wheel to allow the wheel engagement element to rotate the rear wheel when the wheel engagement element is engaged with the rear wheel. Another embodiment of the transmission system includes a motor, a first drive cone coupled the motor; and, a drive cone engagement mechanism configured to allow the first drive cone to be operatively coupled with a wheel to rotate the wheel.

17 Claims, 20 Drawing Sheets

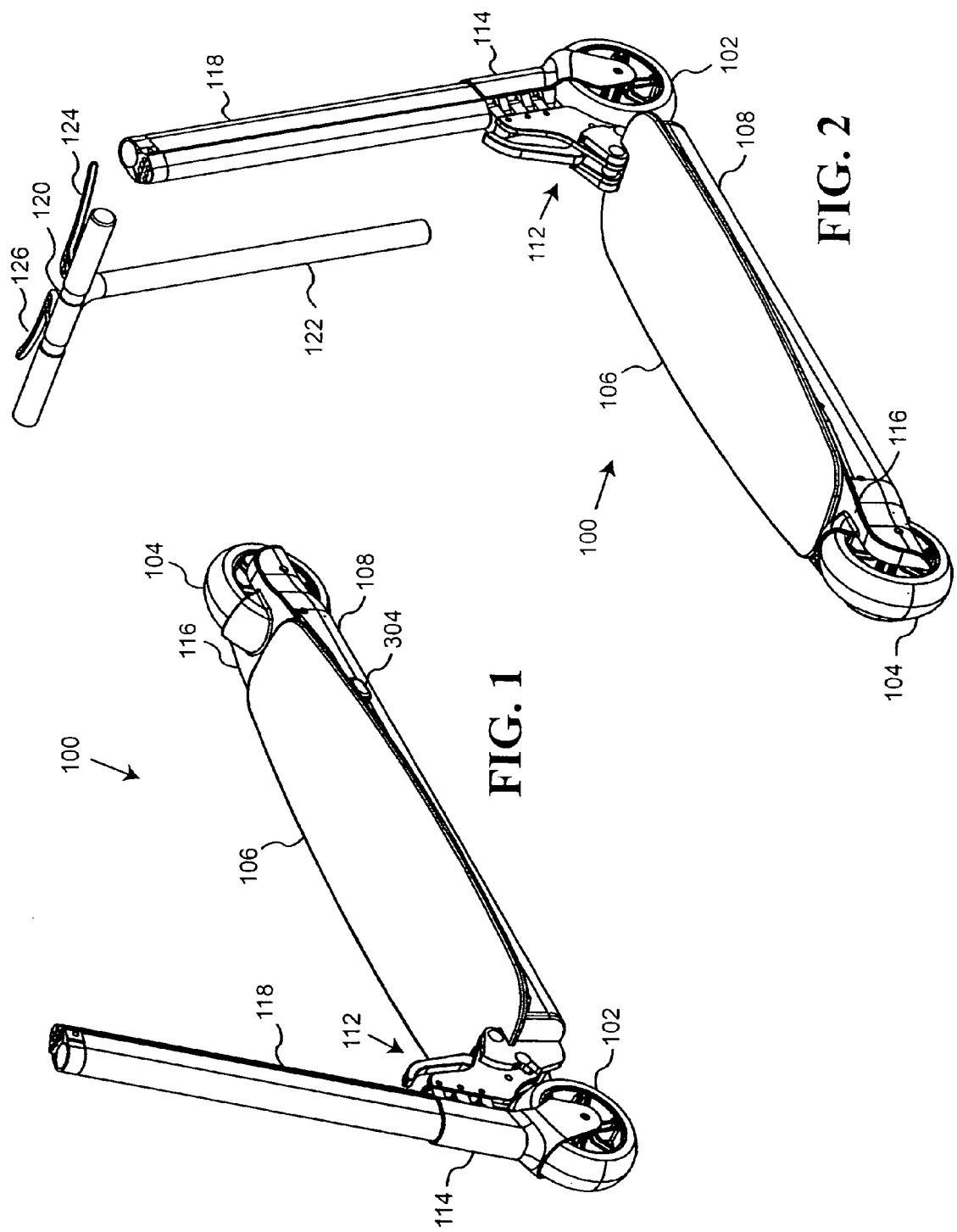

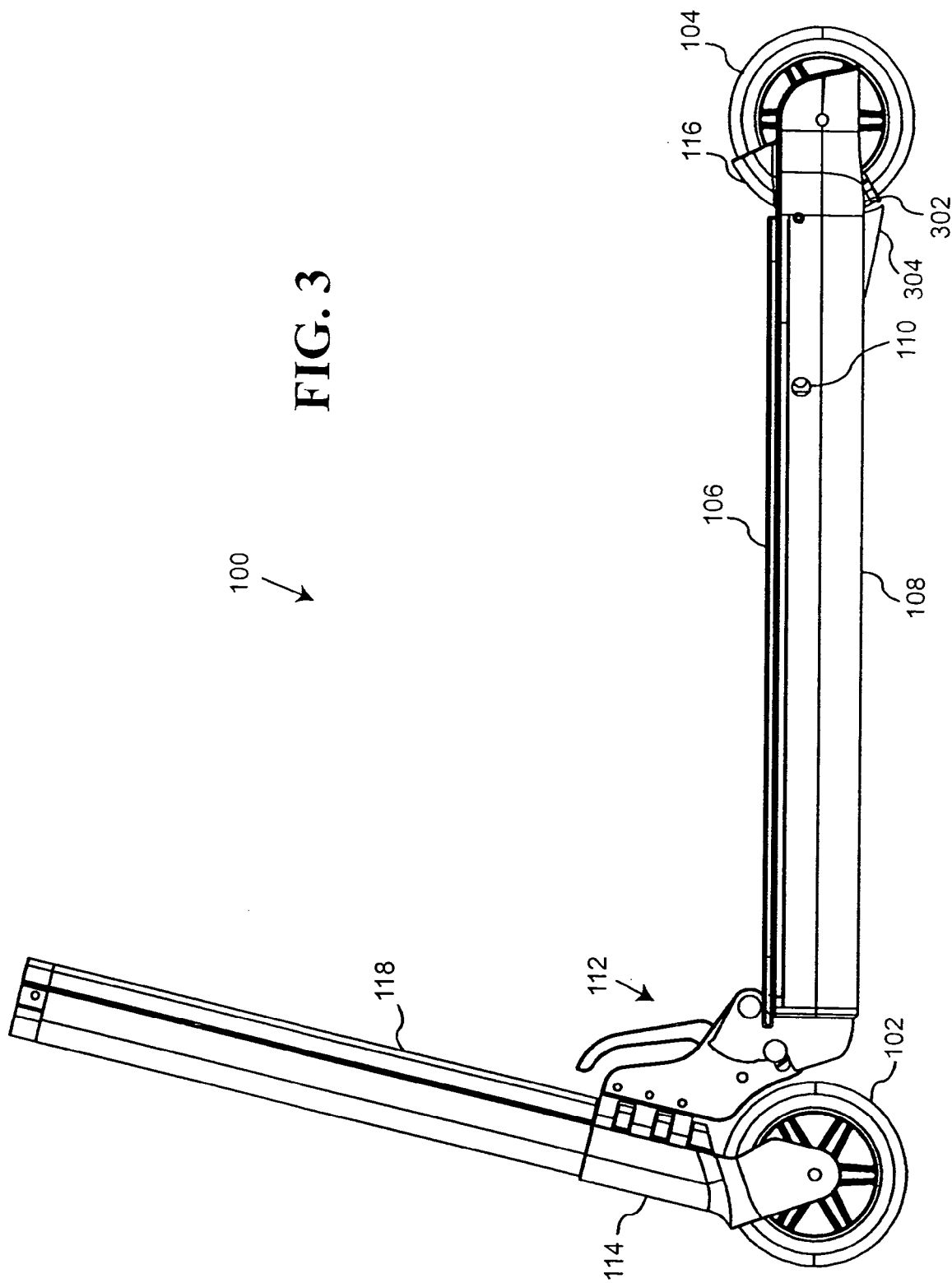

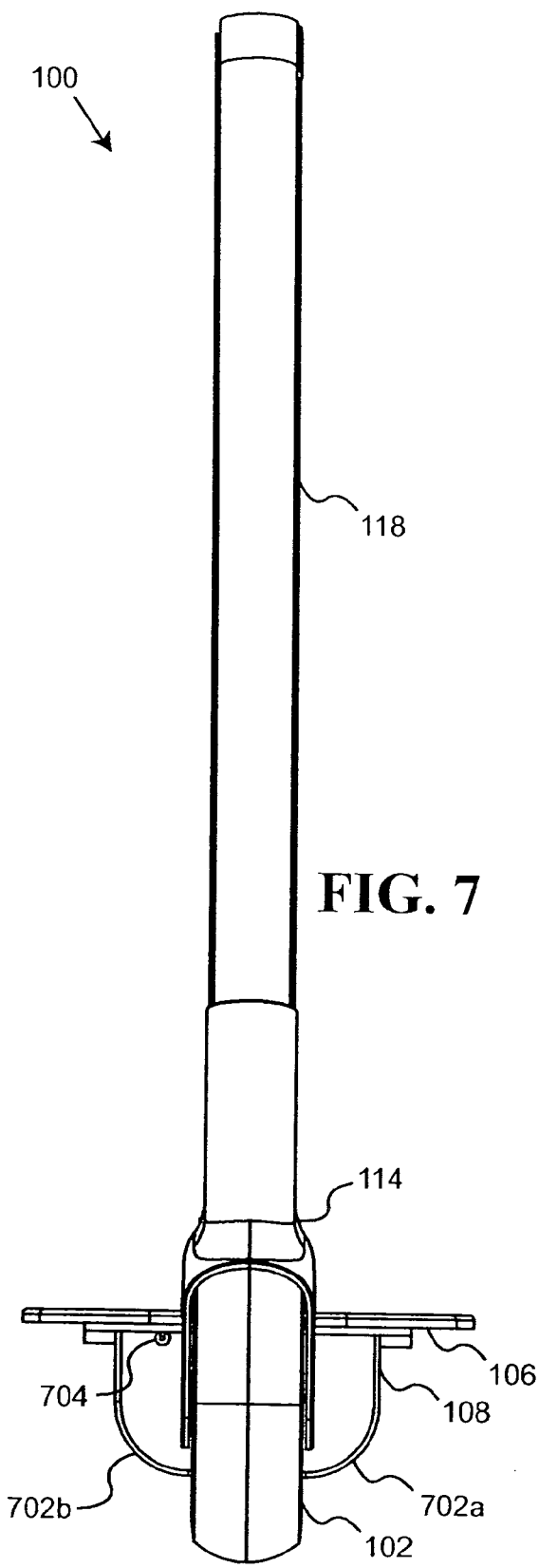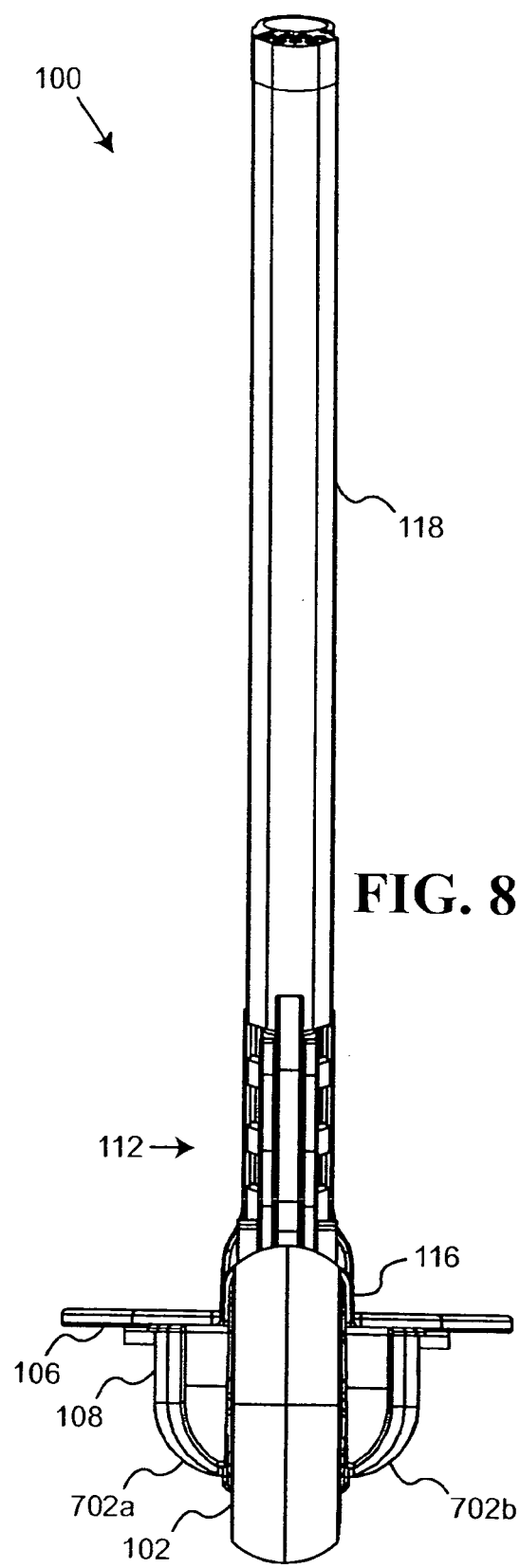

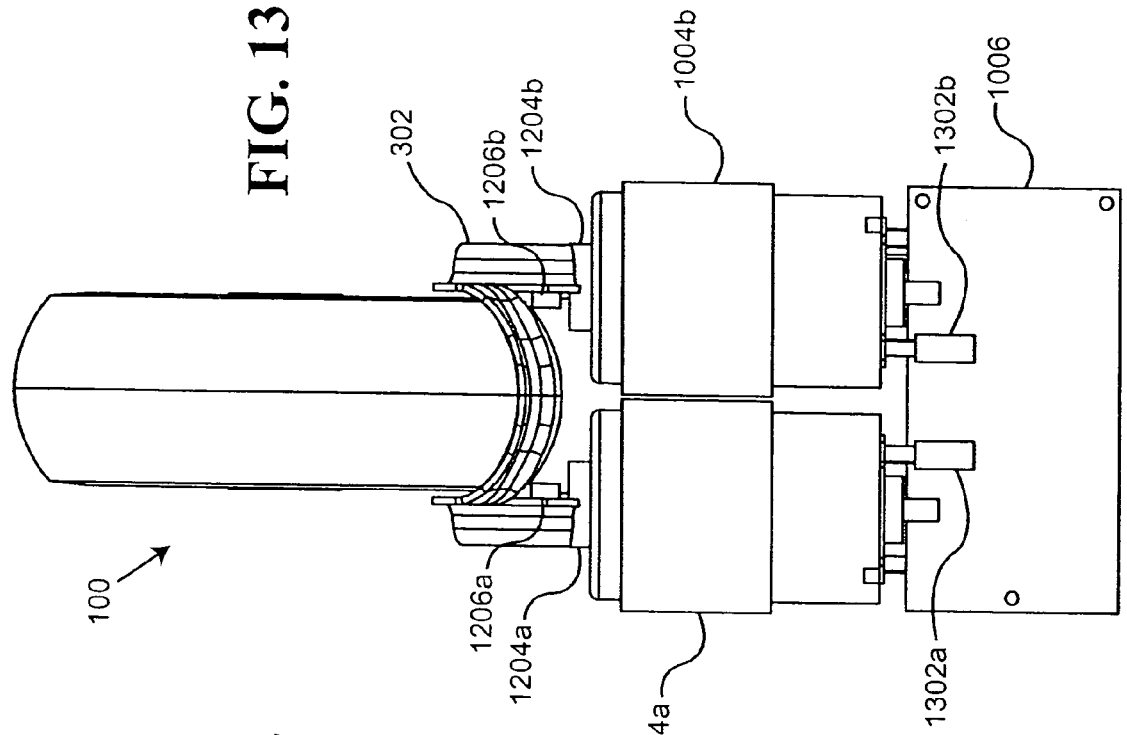
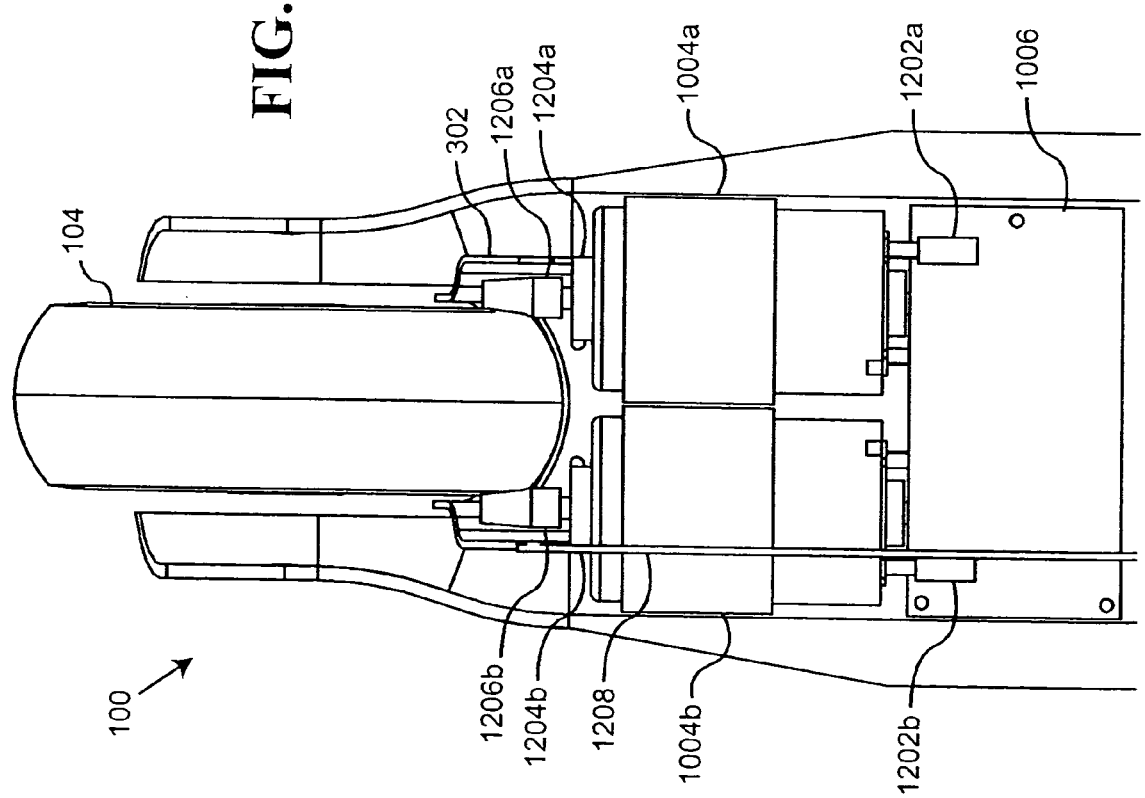

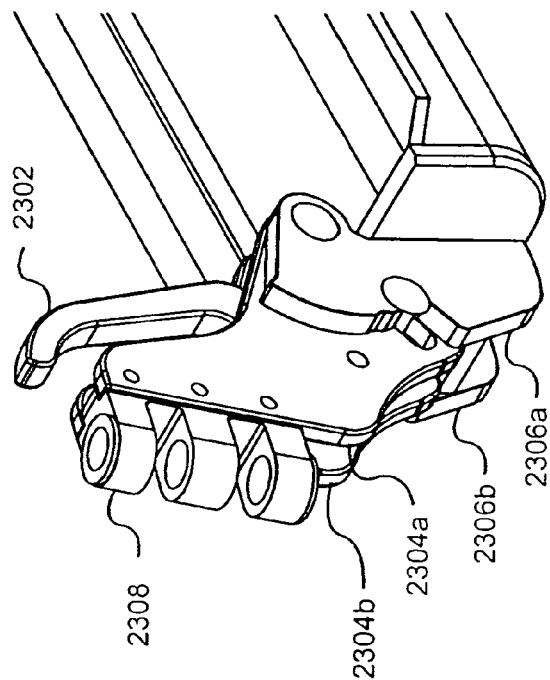
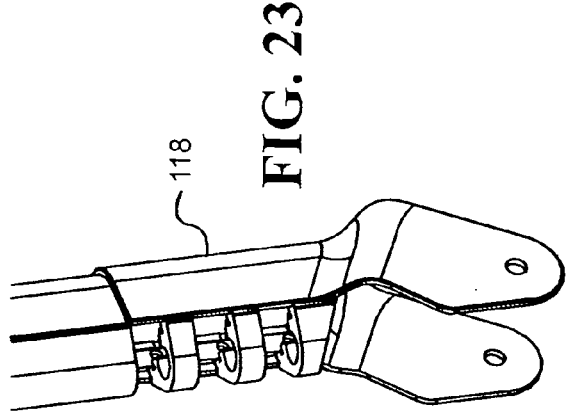
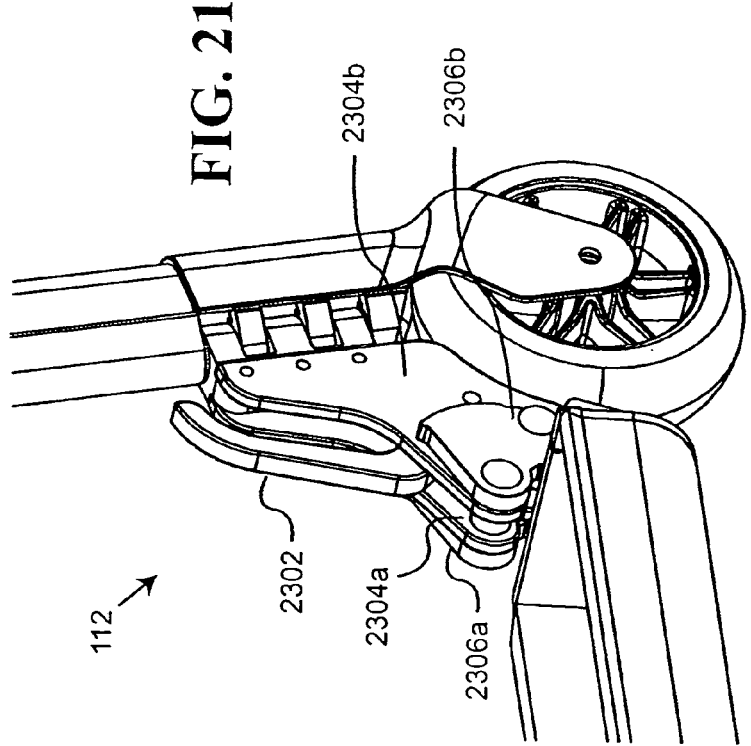

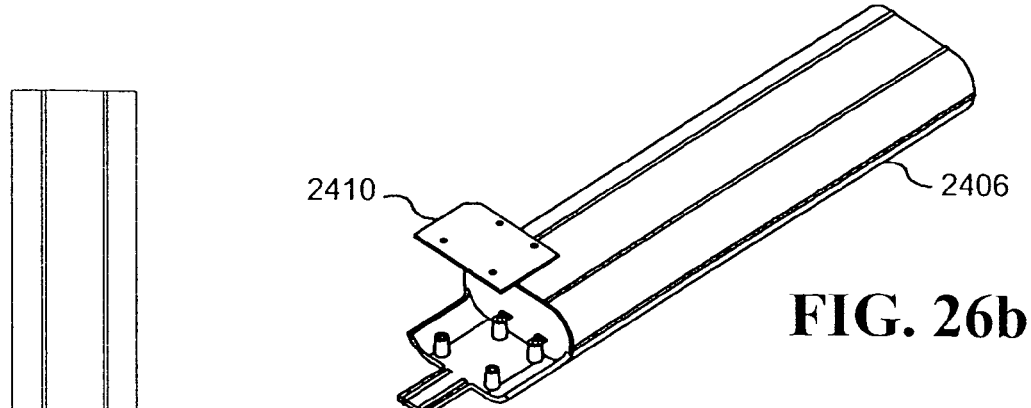
FIG. 26b
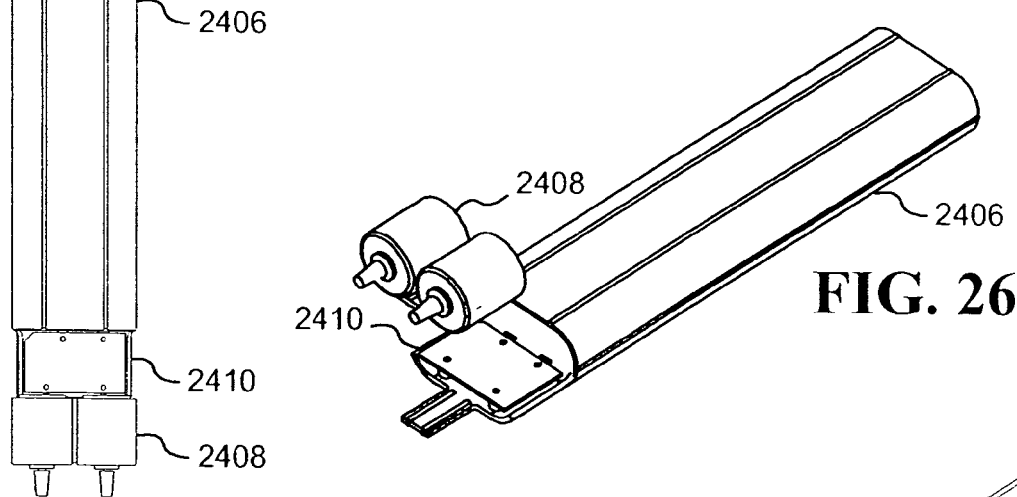
FIG. 26c
FIG. 26a
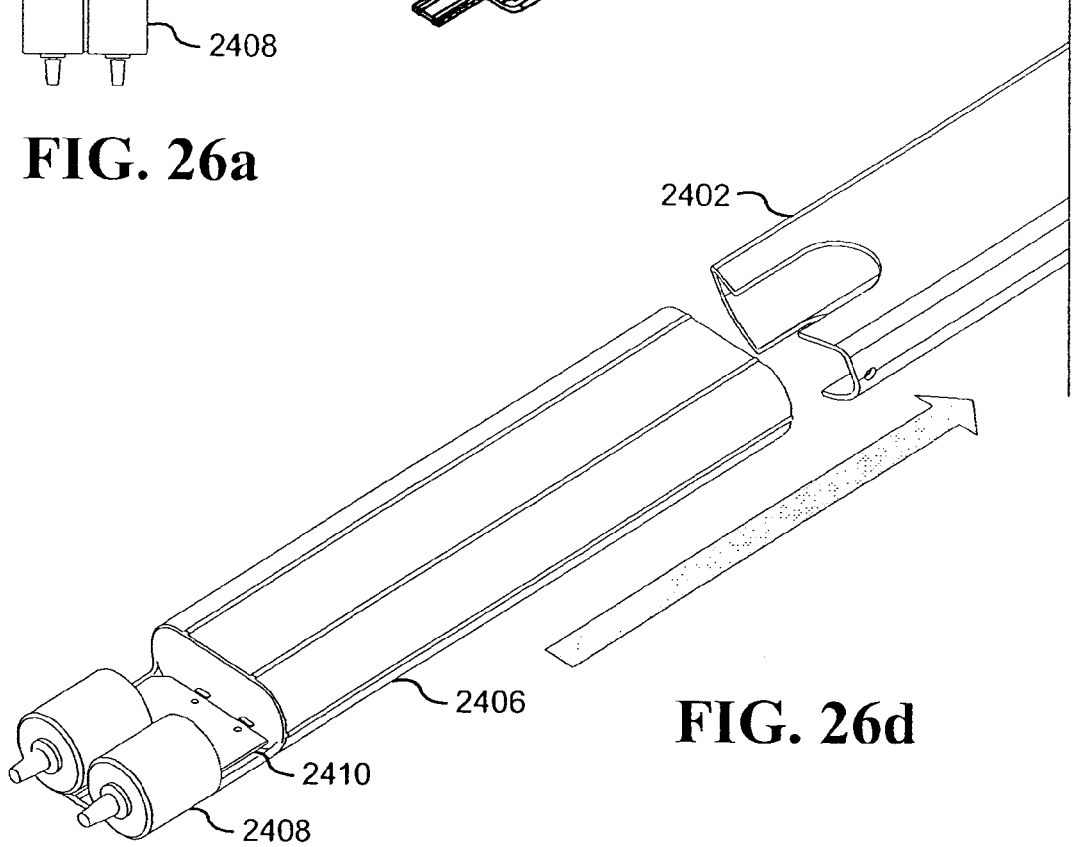
FIG. 26d

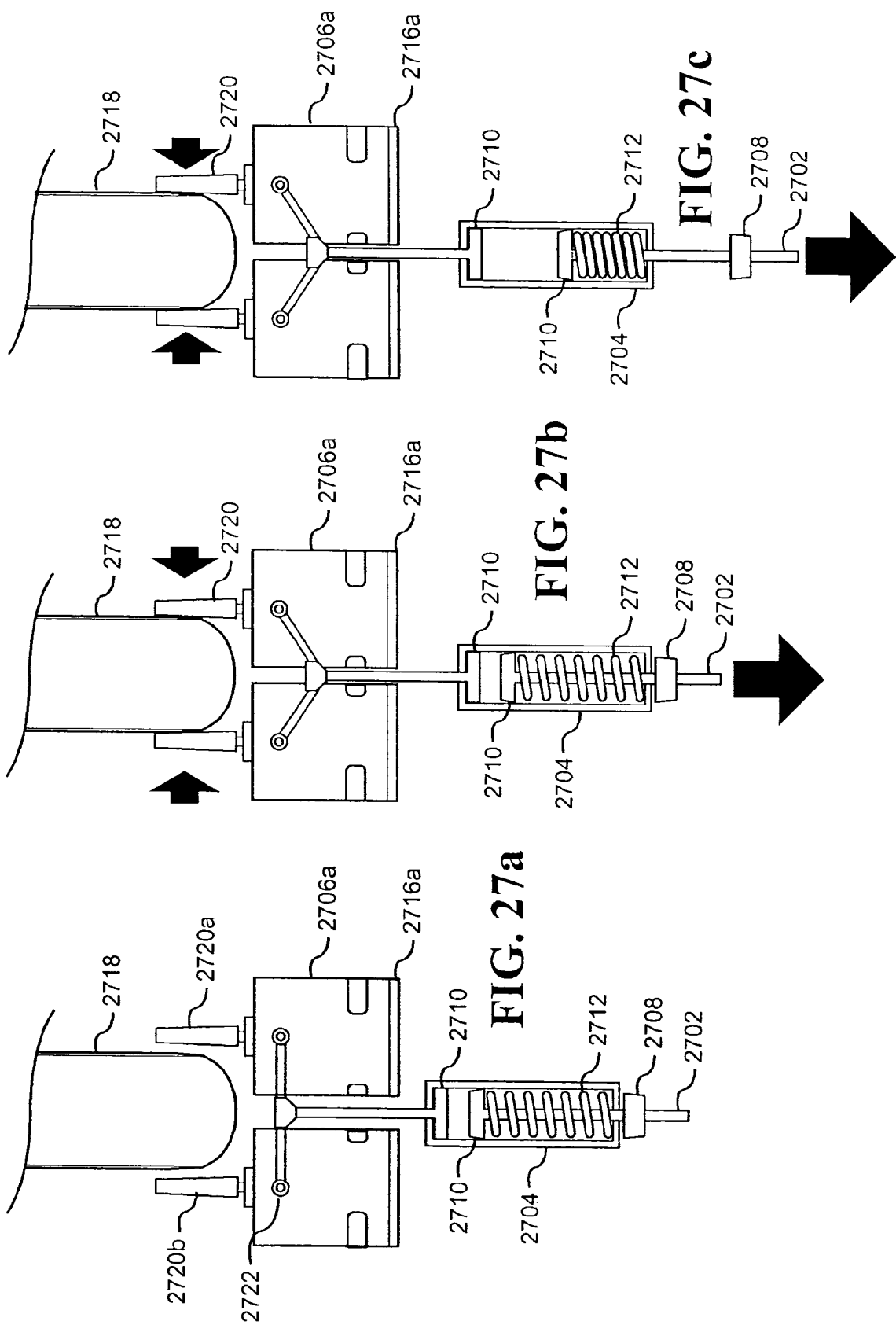

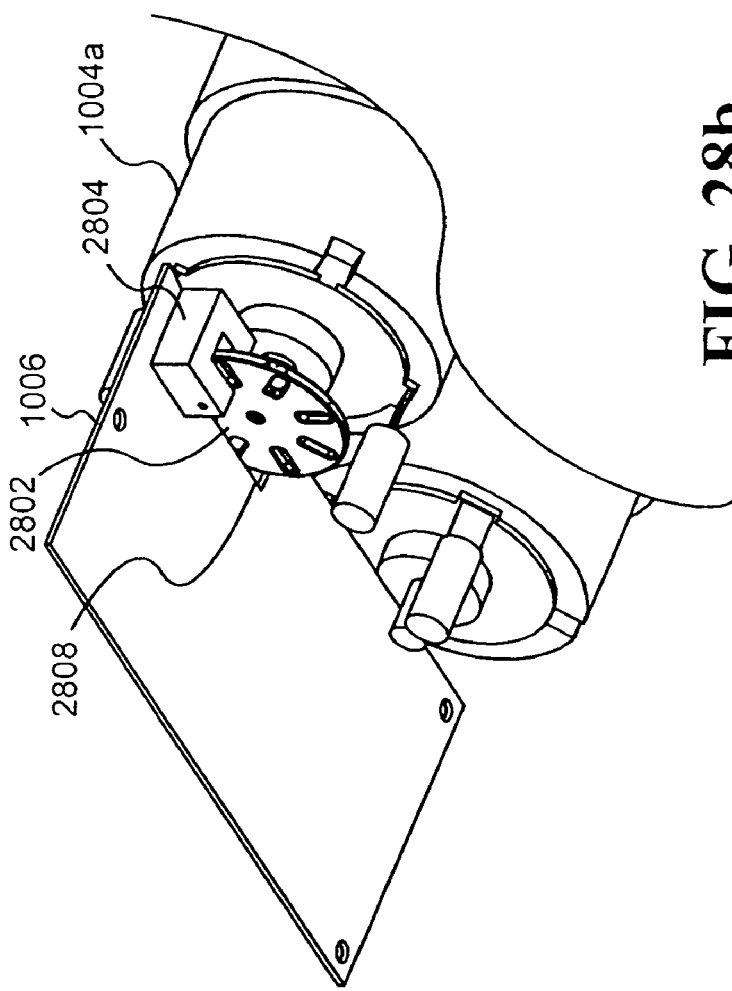
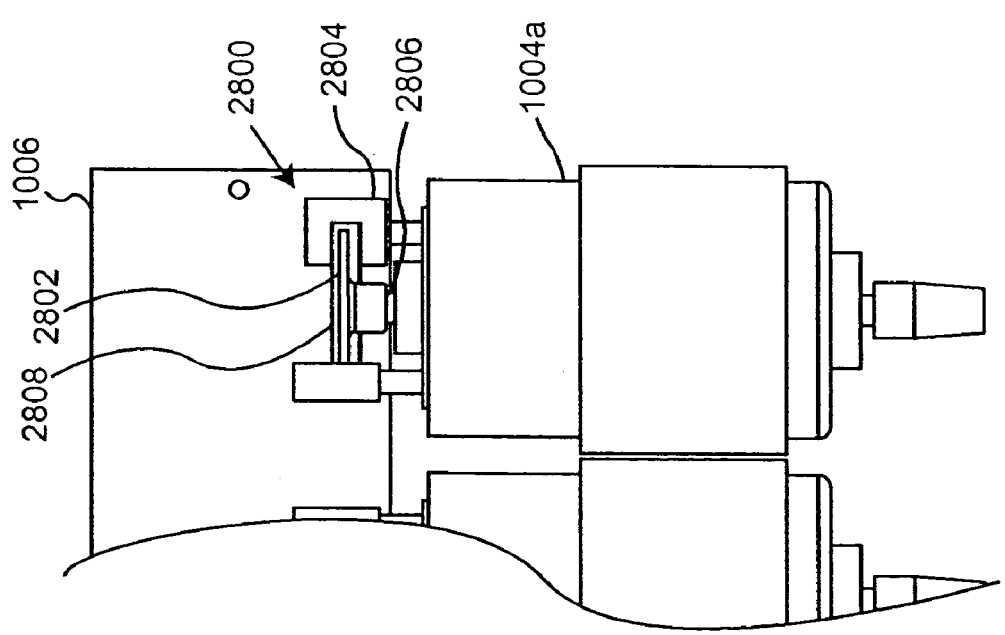
FIG. 28b
FIG. 28a

MOTORIZED SCOOTER

FIELD OF THE INVENTION

The present invention relates generally to motorized scooters, and more particularly, to an electric scooter with low profile propulsion system.

BACKGROUND OF THE INVENTION

Many types of scooters currently exist on the market. One type of scooter is "kick" or "push" scooters that require riders to manually propel the scooter. Although economical to operate as it requires no fuel, kick scooters relies on the operator to propel it. This can be tiring for the operator over long distances. An optional add-on to the kick scooter is a motor and battery system. Typically, the motor and battery is integrated into a single housing, with the drive shaft of the motor protruding from the housing. The housing is rigged to the steering column of the scooter such that the drive shaft of the motor contacts the front wheel of the scooter to drive the wheel ("the drive wheel").

As the run time of the motor is proportional to the capacity of a battery, a fairly large battery is typically used to achieve longer run time, thereby allowing the scooter to be propelled over longer distances. However, the addition of the battery and motor assembly adds tremendous weight and upsets the balance of the scooter as the weight is distributed towards the front portion of the scooter. Thus, the larger the battery, the more upset the balance of the scooter becomes. In another approach, the motor and battery assembly is attached to drive the rear wheel, but this approach also encounters similar problems with improper weight distribution. Moreover, the mounting of the motor as an add-on does not provide the most efficient or consistent contact with the drive wheel. For example, when the scooter goes over a bump or over rough terrain, the motor might become temporarily disconnected from the drive wheel as the motor and battery assembly is not always attached securely or properly to the scooter, and hence the wheel. In addition, once the battery has become drained, then the motor would have to be disengaged from the drive wheel to allow the drive wheel to be "free-wheeling". Otherwise, the operator has to overcome the resistance generated by the motor.

In an attempt to resolve the weight distribution due to the addition of a motor and battery and provide better contact between the motor and the drive wheel, a type of scooter referred to as "motorized" scooters integrates the motor and battery onto the scooter as original equipment. Typically, the motor drives the front or rear wheel, but the battery is separated from the housing of the motor and located on another part of the scooter, such as the body of the scooter. Better weight distribution is achieved, and a transmission may be added to allow better power delivery from the motor to the wheel.

Although the integration of the battery and motor to the scooter as "original" equipment solves some problems, it causes others. For example, the addition of the transmission increase the base cost of the scooter, and is another point of failure. In addition, once the battery runs out, the motor has to be disengaged from the drive wheel. Further, as the motor is typically mounted such that the axis of the motor is parallel to the axis of the wheel, the body of the motor often protrudes out of either the left or right side of the scooter, affecting the balance of the scooter, interfering with the rider's kick stroke, and increasing the risk of damage to the motor due to the exposure (or impact) of the motor to outside elements.

Accordingly, there is a need for a scooter that attempts to overcomes some of the problems stated above.

SUMMARY OF THE PREFERRED EMBODIMENTS

The present invention provides a motorized scooter with a battery, motor and transmission assembly that is integrated into a fuselage of the motorized scooter; and a folding hinge and steering mechanism.

In one preferred embodiment of the present invention, the scooter includes a fuselage with a front portion and a rear portion that has a rear wheel rotatably mounted at the rear portion. The scooter also includes a standing platform supported by the fuselage for supporting a rider and a transmission system mounted under the standing platform in the rear portion of the fuselage. The transmission system has a motor with a wheel engagement element being operatively coupled with the rear wheel to allow the wheel engagement element to rotate the rear wheel when the wheel engagement element is engaged with the rear wheel.

In one embodiment of the present invention, the transmission system includes a dual-motor direct drive system for driving a wheel, each motor having a motor shaft and a drive cone coupled to a first end of the motor shaft. The drive cone of each motor engages opposing side portions of the wheel to rotate the wheel. In another embodiment, the transmission system includes a motor, a first drive cone coupled the motor, and a drive cone engagement mechanism configured to allow the first drive cone to be operatively coupled with a wheel to rotate the wheel.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 1 is a left front perspective view of a motorized scooter configured in accordance with one embodiment of the present invention.

FIG. 2 is a right rear perspective view of the motorized scooter of FIG. 1.

FIG. 3 is a left side elevation view of the motorized scooter of FIG. 1.

FIG. 7 is a front elevation view of the motorized scooter of FIG. 1.

FIG. 8 is a back elevation view of the motorized scooter of FIG. 1.

FIG. 12 is a top plan view of a drive system configured in accordance with one embodiment of the present invention for use with the motorized scooter of FIG. 1.

FIG. 13 is a bottom plan view of the drive system of FIG. 12.

FIG. 21 is a close-up right rear perspective view of the steering and hinge system of FIG. 18.

FIG. 22 is a close-up left front perspective view detailing the hinge portion of the steering and hinge system of FIG. 18.

FIG. 23 is a close-up right rear perspective view detailing a portion of the steering portion of the steering and hinge system of FIG. 18.

FIGS. 26a–d illustrate a second integrated motor, battery and electronics system configured in accordance with one embodiment of the present invention.

FIGS. 27a–c illustrate a second drive system configured in accordance with one embodiment of the present invention.

FIGS. 28a–b are bottom and front left perspective views, respectively, of a tachometer system configured in accordance with one embodiment of the present invention.

Like numerals refer to like parts throughout the several views of the drawings.

DETAILED DESCRIPTION

Figure 4:
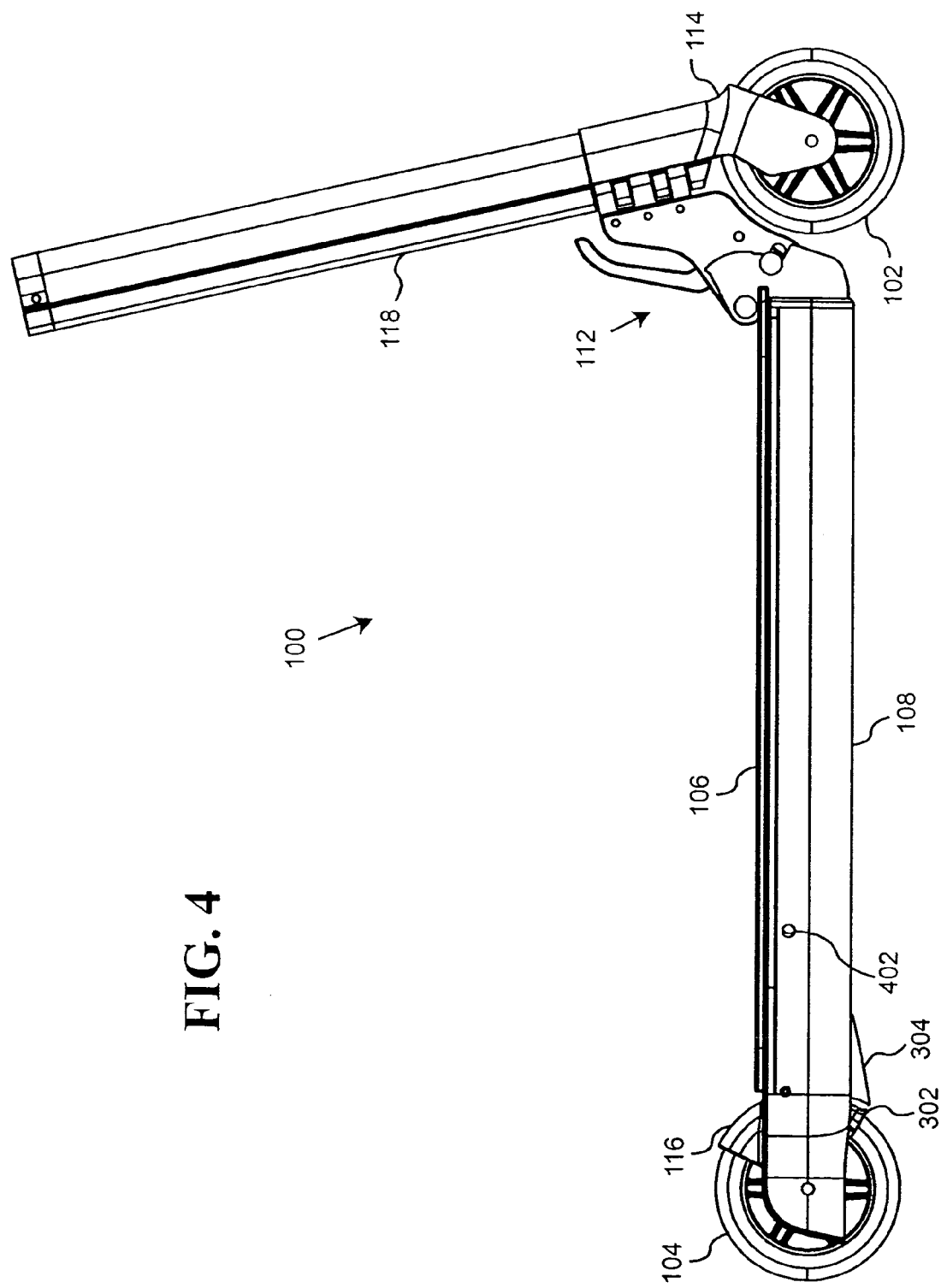
FIG. 4 is a right side elevation view of the motorized scooter of FIG. 1.

FIGS. 1 and 2 are front left and rear right perspective views, respectively, of a motorized scooter 100 with a fuselage 108 configured in accordance with one embodiment of the present invention. The front portion of fuselage 108 includes a front wheel 102 and a steering column 118. Both front wheel 102 and front fender 114 are mounted on a steering column 118 that is attached to fuselage 108 with a steering and hinge system 112. Motorized scooter 100 also includes a rear wheel 104 mounted to fuselage 108, with a rear fender 116 covering rear wheel 104. In addition, a deck 106 also covers fuselage 108. A handle bar 120 with a handle bar stem 122 is illustrated as being unmounted from steering column 118. Handle bar 120 includes a brake control lever 126 and a power control lever (throttle) 124 that are coupled to brake and power control cables (not shown in this figure) to control the braking and powering in motorized scooter 100, respectively.

FIGS. 3 and 4 are left and right elevation views, respectively, of motorized scooter 100. A power switch 110 as well as a power jack 402 is located on fuselage 108. In addition, a cap (not shown) may be used to cover power jack 402 to prevent dust and water from entering power jack 402. When motorized scooter 100 needs to be recharged, the cap is removed to allow an external charger (not shown) that includes a power plug (not shown) to be connected to power jack 402.

A brake system 302, which will be further discussed below, is mounted on the rear portion of fuselage 108 to engage rear wheel 104. A skid plate 304 is also mounted in front of brake system 302 to prevent or minimize any damage that brake system 302 may experience from any obstacles that motorized scooter 100 encounters. In one preferred embodiment, the bottom surface of skid plate 304 extends as low as brake system 302 so as to provide an inverted ramp that will allow an obstacle to be struck by motorized scooter 100 and pass over. Thus, the obstacle will slide under skid plate 304 and the forward motion of motorized scooter 100 will keep the obstacle moving past brake system 302 and then onto rear wheel 104.

Figure 5:
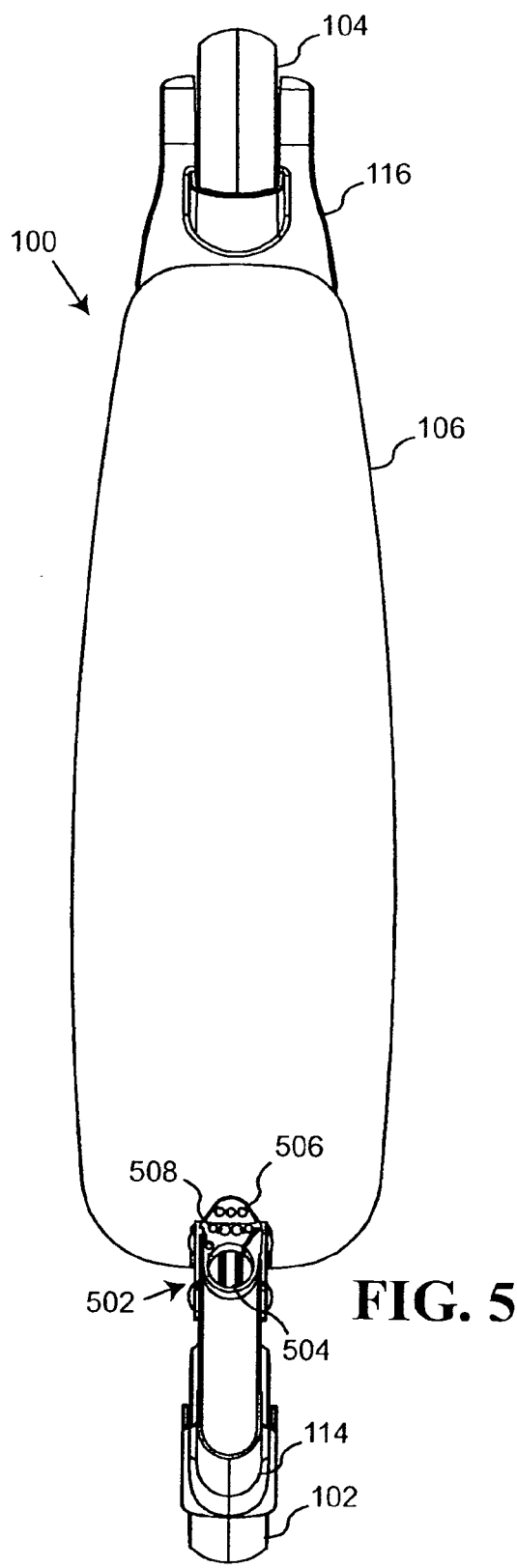
FIG. 5 is a top plan view of the motorized scooter of FIG. 1.
Figure 6:
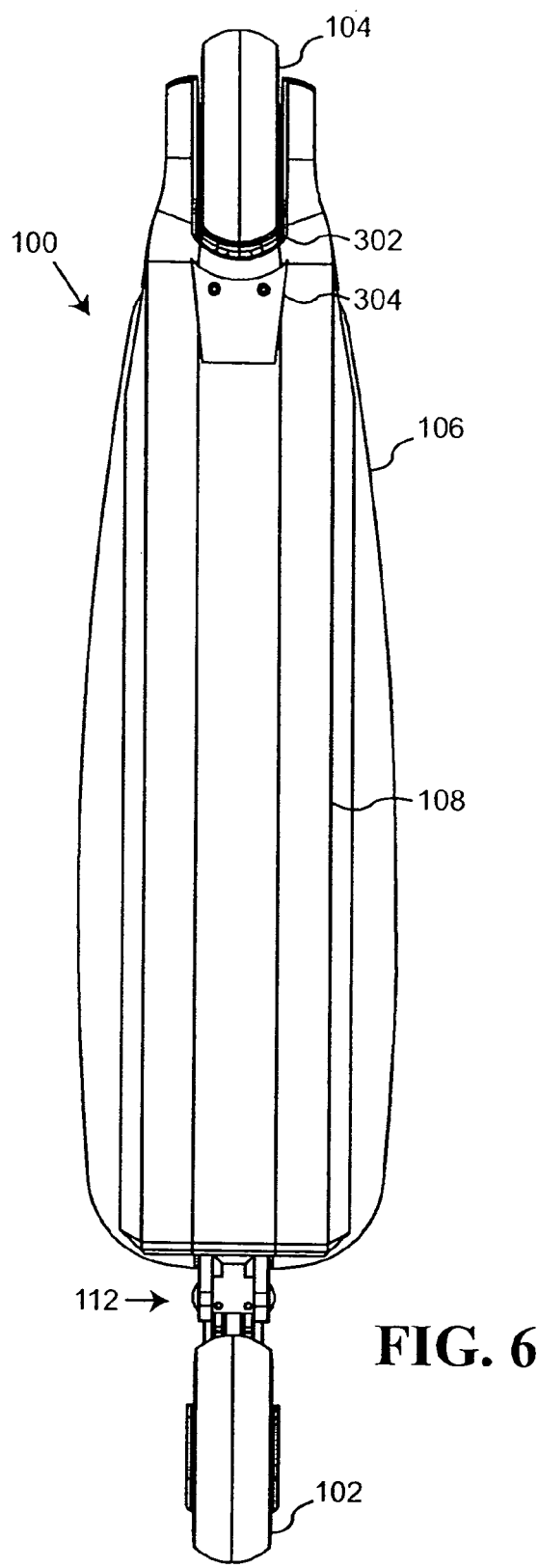
FIG. 6 is a bottom plan elevation view of the motorized scooter of FIG. 1.

FIGS. 5 and 6 are top and bottom plan views, respectively, of motorized scooter 100, with the top plan view illustrating a steering column head 502 at the tip of steering column 118, including a steering column clamp 502 and a set of information indicators 504. Steering column clamp 502 is used for mounting handle bar stem 122 of handle bar 120 while set of information indicators 504 is used to provide status information for motorized scooter 100. Further information regarding steering column clamp 502 and set of information indicator 504 are provided below.

FIGS. 7 and 8 are front and rear elevation views, respectively, of motorized scooter 100, illustrating the rounded shape of fuselage 108 as well as a cable retaining hole 704 in fuselage 108. As seen in the figures, fuselage 108 includes a pair of rounded corners 702, which is designed to increase the permissible turning angle of motorized scooter 100. For example, left rounded corner 702a, located on the left side of motorized scooter 100, allows for better cornering of the scooter during left turns as the scooter may be "leaned-into" the turn. In addition, rounding fuselage 108 allows fuselage 108 to be lower to the ground, decreasing the center of gravity of motorized scooter 100 to offer better stability, as well as making scooter 100 easier to kick and safer to step off of in emergency situations than a similar scooter with a higher deck height. As further described below, the center of gravity of motorized scooter 100 is further enhanced by the integration of the propulsion system inside fuselage 108. In one preferred embodiment, the height of the top surface of deck 106 from the surface of the ground is less than 4 inches, with a ground clearance of the bottom surface of fuselage 108 being approximately 1.5 inches.

Figure 9:
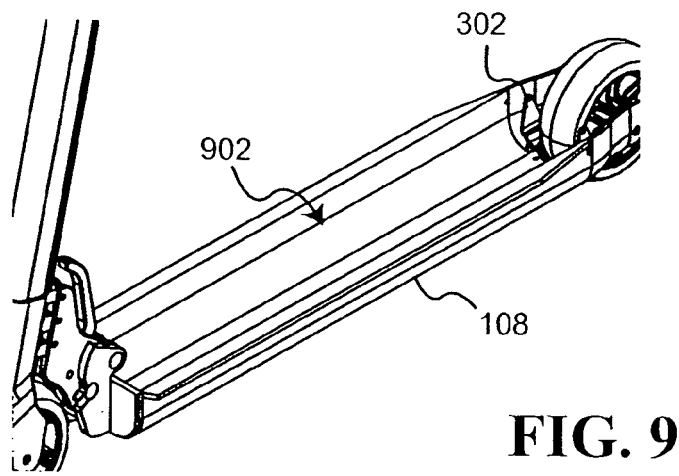
FIG. 9 is a close-up left front perspective view of the fuselage of the motorized scooter of FIG. 1.
Figure 10:
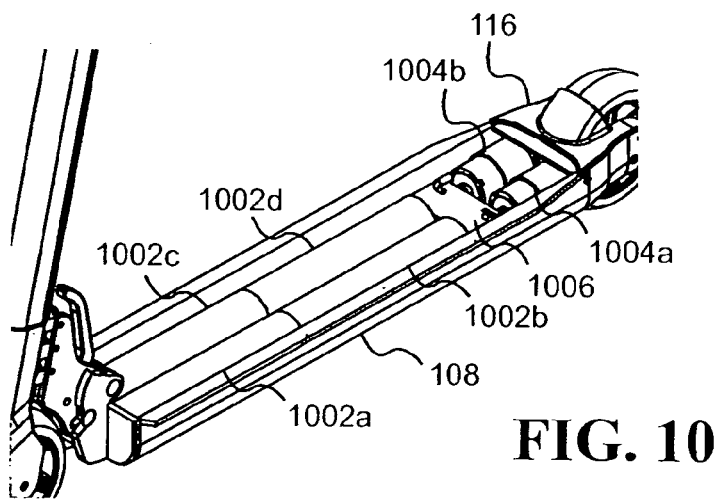
FIG. 10 is a close-up left front perspective view of an integrated motor, battery and electronics system configured in accordance with one embodiment of the present invention for use with the motorized scooter of FIG. 1.
Figure 11:
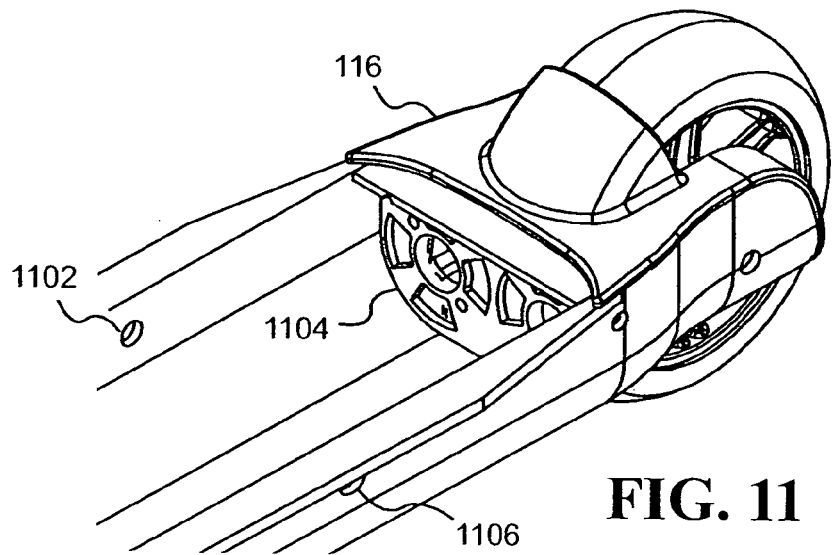
FIG. 11 is a close-up left front perspective view of the rear portion of the fuselage of the motorized scooter of FIG. 1.

FIGS. 9, 10 and 11 show one preferred embodiment of the internal construction of motorized scooter 100 and provide interior views of fuselage 108, along with an integrated propulsion system 1000 of motorized scooter 100. Integrated propulsion system 1000 includes a set of batteries 1002, a circuit board 1006 and a pair of motors 1004. As shown in FIG. 9, fuselage 108 has an open-top, U-shaped interior tray 902. Integrated propulsion system 1000 is completely contained in the U-shaped interior of fuselage 108, and a motor bracket 1104 is used to mount pair of motors 1004 in the rear portion of fuselage 108. Also, shown in FIG. 11 is a power jack opening 1102 through which a power jack (not shown) is accessible externally of fuselage 108. Fuselage 108 also includes a switch mount opening 1106 through which power switch 110 is mounted to circuit board 1006. In another embodiment, power switch 110 is not mounted on circuit board 1006 but is electrically coupled to it.

FIGS. 12 and 13 are top and bottom views, respectively, of pair of motors 1004 and circuit board 1006 that details certain features of pair of motors 1004 and circuit board 1006. In one preferred embodiment, each motor in pair of motors 1004 is a brushed direct current (DC) motor. Pair of motors 1004 is mounted to circuit board 1006 with a set of contacts 1202 and 1302. Set of contacts 1202 and 1302 may be directly soldered or otherwise electrically coupled to circuit board 1006. Also shown in the figures is a pair of wheel engagement elements 1206, one for each one of the motors in pair of motors 1004, which engage rear wheel 104 as a transmission system as further described herein.

Each motor of pair of motors 1004 includes a set of ball bearings 1204 integrated into the casing of the motor. Set of ball-bearings 1204 provides lateral support of the rotor shaft of each motor as the forces caused by the compression of rear wheel 104 between pair of wheel engagement elements 1206 constantly pushes pair of wheel engagement elements 1206 outward, away from each other, in a lateral direction.

In one preferred embodiment of the present invention, pair of motors 1004 of integrated propulsion system 1000 are configured to rotate in opposite directions from each other, with rear wheel 104 compressed between wheel engagement elements 1206. For example, to propel motorized scooter 100 forward, motor 1004a rotates in a clockwise fashion while motor 1004b rotates in a counter-clockwise fashion—both directions measured from a view external to the motor facing the shaft end. Thus, the directions of rotation are directly opposite between each motor in pair of motors 1004.

Rear wheel 104 is preferably constructed from materials that include one or more of the following features: high-rebound, low hysteresis, heat tolerant, high dry traction or abrasion and tearing resistant. These can include such materials as high performance polyether based polyurethanes, various silicones, or compounds/mixes of them (including compounds constructed using materials suspended in them).

Wheel engagement elements 1206 are geometrically configured to engage rear wheel 104. In one preferred embodiment, wheel engagement elements 1206 are cone-shaped, with the shape of wheel engagement elements 1206 matching the geometry of the sidewalls of rear wheel 104 (e.g., the cone may be attached with the wide or narrow end closer the axis of the wheel). The cones will drive the wheel equally from the front part of the cone to the back. Thus, each wheel engagement arrangement acts as a bevel gear with no teeth, which is similar in theory to a bevel gear in that the arrangement mimics the geometrically correct rolling engagement of a bevel gear in a friction drive. The size of the cone, in combination with the motor performance curves, determines the speed efficiency and acceleration. The use of larger cones will provide more traction on the side of the tire while the use smaller cones provide more mechanical reduction and therefore allows the use of higher rotation per minute (RPM) motors. In general, higher RPM motors are smaller and more efficient. In one preferred embodiment of the present invention, wheel engagement elements 1206 are constructed of stainless steel. In another embodiment, wheel engagement elements 1206 may be constructed of porous sintered powdered metal. In yet another embodiment, wheel engagement elements 1206 may be constructed of urethane, silicone or other high traction polymer.

In determining the shape and parameters of wheel engagement elements 1206, the following variables and factors can be considered:

1. Desired motor efficiency (higher RPM translates to more efficiency).
2. Available traction between the wheel engagement element and the tire.
3. Desired acceleration (thrust).
4. Desired maximum speed.
5. Desired tire crown.

In one preferred embodiment, the diameter of the cone is first minimized so as to produce the highest motor RPM for efficiency purposes. One limitation to minimizing the parameters of the cone is the need to maintain sufficient cone/sidewall contact so that there is sufficient sidewall traction for a suitable range of conditions. In addition, the parameters of pair of motor 1004 are chosen to optimize the torque/RPM ranges over which the system will operate, which is a balance between the desire to use a cone size with enough grip, which maximizes the cone size but lowers the RPM versus the desire for higher RPM which is more efficient.

Once the motor torque/rpm/power/efficiency is determined, the size of the cone's major diameter from the desired speed and the motor RPM at the desired efficiency can be determined, taking into consideration the ratios of the tire's outer diameter and the sidewall engagement area's outer diameter. After the cone's major diameter has been determined, it must be checked to see if the acceleration it will provide is acceptable for the specific application.

The length of the contact between the tire and the wheel engagement element, also referred to as a "traction line" and measured along the long axis of the "wheel engagement element" is then determined. Using the diameters (outer diameter of the traction patch on the tire, the major diameter of the wheel engagement element), and the length of the traction line of engagement between tire and wheel engagement elements, calculations similar to those used to design a bevel gear to the above mentioned variables may be performed to determine a proper cone angle and axial length for wheel engagement elements 1206, and for the tire sidewall. This calculation will also determine the detailed engineering of the spacing of the motors and the width of the tire.

It should be noted that a tire with a higher crown will provide better cornering characteristics, but will require a longer motor shaft. A longer motor shaft will undesirably increase bearing loads. Thus, the consideration is between turning properties versus permissible motor shaft "overhung load."

In one preferred embodiment, the various parameters of the transmission system is determined through the use of the following formulas:

$$DPOD=TOD-(2*CH)$$

$$TRPM=((S*5280*12)/(pi*TOD))/60$$

$$RRR=MRPM/TRPM$$

$$CMD=DPOD/RRR$$

$$DPID=DPOD-(2*CL)$$

$$CMID=DPID/RRR$$

$$CIA=2*(ATAN(((CMD-CMID)/2)/CL))*(180/pi) \text{ (degrees)}$$

where,
- TOD: Tire outer diameter, or tire diameter (measured from center of tire to edge of tire).
- CH: Crown height. For example, the crown height is 0 for a tire that is perfectly cylindrical.
- DPOD: Outer diameter of drive patch.
- DPID: Inner diameter of drive patch.
- S: Desired speed.
- TRPM: Rotation per minute of tire.
- MRPM: Rotation per minute of motor.
- RRR: Reduction ratio required.
- CMD: Major diameter of cone.
- CMID: Minor diameter of cone.
- CL: Cone length.
- CIA: Cone included angle, in degrees, which is the angle of the incline of the cone. This is also the tire side wall included angle for a matched tire—i.e., a tire with a portion of its sidewalls that has the same angle as the CIA.

Table 1 provides a list of sample values calculated using the above formulae for different speeds:

TABLE 1

| Units | Values | | | | |
|---|---|---|---|---|---|
| S (MPH) | 10 | 12.5 | 15 | 17.5 | 20 |
| TOD | 4.92 | 4.92 | 4.92 | 4.92 | 4.92 |
| CH | 0.27 | 0.27 | 0.27 | 0.27 | 0.27 |
| MRPM (RPM) | 12,500 | 12,500 | 12,500 | 12,500 | 12,500 |
| CL | 0.45 | 0.45 | 0.45 | 0.45 | 0.45 |
| DPOD | 4.38 | 4.38 | p | 4.38 | 4.38 |
| TRPM (RPM) | 683.03 | 853.78 | 1,024.54 | 1,195.30 | 1,366.05 |
| RRR (no units) | 18.30 | 14.64 | 12.20 | 10.46 | 9.15 |
| DPID | 3.48 | 3.48 | 3.48 | 3.48 | 3.48 |
| CMD | 0.24 | 0.30 | 0.36 | 0.42 | 0.48 |
| CMID | 0.19 | 0.24 | 0.29 | 0.33 | 0.38 |
| CIA (degrees) | 6.26 | 7.81 | 9.37 | 10.92 | 12.47 |

All distance units in table 1 are in inches except where otherwise noted.

In one preferred embodiment of the present invention, each motor in pair of motors 1004 is clocked differently, where one is specifically clocked for counter-clockwise operation, and the other one is for clockwise operation. The clocking is achieved by using variations and variability in the commutation to change the phasing of the electromagnet rotor in relation to the rotational direction, optimal speed, and configuration of the stator's magnetic field. [Do we have sample specification for the clocking?] Customization of the clocking to the anticipated rotation of a motor provides higher efficiency and RPM, and moderate improvement in achieving higher torque values. The clocking may also be used to reduce the back electromagnetic force when the motor is not supplied with electricity.

Continuing to refer to FIGS. 12 and 13, circuit board 1006 includes circuitry that controls the power that is provided to pair of motors 1004. Specifically, circuit board 1006 regulates the flow of power between batteries 1002 to and from pair of motors 1004. Throttle 124 may be coupled to circuit board 1006 electrically or mechanically to provide desired throttle settings. For example, throttle 124 may contain circuitry to provide a measurable variable resistance based on the position of the lever, which allows circuitry in circuit board 1006 to vary the power supplied to pair of motors 1004 based on a measurement of the variable resistance. In another embodiment, throttle 124 may operate a cable that connects to a spring-loaded mechanism on circuit board 1006 that measures the position of the lever by measuring the amount of tension that is exerted by the cable.

In one preferred mode of operation, power switch 110 is normally ON—i.e., in a "closed" position—to allow circuit board 1006 to be energized. Moreover, power switch 110 may either in the ON or OFF position to recharge batteries 1002. Circuit board 1006, in addition to controlling the expenditure of power, may also be used to capitalize on the unique configuration of pair of motors 1004 and the mode of operation of motorized scooter 104 to achieve greater operating efficiencies.

Circuit board 1006 may monitor the physical parameters of motorized scooter 100, including the monitoring of the electrical system of motorized scooter 100. In one preferred embodiment of the present invention, the status of pair of motors 1004 may be monitored and tracked, including the position, speed, or acceleration of pair of motors 1004, as well as temperature of the surrounding environment and of the motors themselves. Monitored information allows the detection of any slippage of rear wheel 104, such as from pair of motors 1004 operating at a position, speed or acceleration that indicates that rear wheel 104 is operating outside of its normal parameters. In addition, circuit board 106, in one embodiment of the present invention, will not provide power to pair of motors 1004 unless it is detected that scooter 100 is going at a certain speed. This feature will save power (more power is expended to start the system in motion than to maintain a system in motion), allow scooter 100 to be geared for higher speed operation (it will be assumed that the powered transmission will only have to operate at higher speeds and thus the gearing can be optimized for these speeds), and safety (prevents accidental starts). Monitored information may also indicate that a part of the system is malfunctioning, including situations such as where one or both of pair of motors 1004 is inoperative or acting outside of its operating characteristics. Circuit board 1006 may then take appropriate action, such as turn off or reduce the amount of power being provided. Thus, information such as battery charge remaining, motor over/under-speed detection/protection and system logic fault may be determined by circuit board 1006.

In one embodiment of the present invention, the operation of pair of motors 1004 as dynamos may be used to recharge set of batteries 1002 or otherwise provide power to circuit board 1006. As pair of motors 1004 is always engaged with rear wheel 104, regenerative braking circuitry is contained in circuit board 1006 and used to recapture energy from the motors. In one preferred embodiment of the present invention, the regenerative braking circuitry is controlled based on the manipulation of throttle 124 (i.e., speed controller), similar to when a manual transmission in a car is left in gear and the accelerator pedal is not pressed. For example, the regenerative system turns off and allows freewheel operation of scooter 100 when throttle 124 is released all the way (i.e., when the lever is not engaged). Otherwise, the regenerative braking operates in a manner corresponding to the amount of throttle applied. For example, if throttle 124 is fully engaged (i.e., throttle 124 is fully pulled back to achieve the highest speed) and then slightly released, the system will regeneratively brake if it is required to slow down the system. If throttle 124 is almost fully released (i.e., maximum deceleration is desired), then the maximum regenerative braking will be applied and maximum deceleration effect due to the regenerative braking will occur. Thus, in this case, it is mainly the regenerative braking circuitry and the resistance of pair of motors 1004, and not braking system 302, which is operating to slow down motorized scooter 100. In another mode of operation, circuit board 1006 may also engage the regenerative braking circuitry if it detects that the user is engaging braking system 302. Thus, in this regenerative braking mode, circuit board 1006 may detect that brake system 302 is being used, and engage the circuitry used to operate pair of motors 1004 as dynamos and recapture the energy from pair of motors 1004. In any case, in one preferred embodiment of the present invention, it is important that the normal, "powered," operation of the system not cause interfere with the free wheeling operation of motorized scooter 100. This is because, during the time that the regenerative braking circuitry is engaged, electromagnetic energy created by pair of motors 1004, being operated as dynamos, will hamper the free rotation of rear wheel 104.

In another preferred embodiment, pair of motors 1004 may be reciprocally connected during the freewheeling of motorized scooter 100 such that energy generated from one motor will be provide to the other motor, and vice versa. Thus, one motor will act as a dynamo to generate power for the other to the extent that this does not result in a net increase of energy, but serves to dramatically reduce the "magnetic cogging" typical of free spinning brushed DC motors, which in turn increases efficiency and makes a dramatic improvement in the smoothness of the freewheel kick operation. To maximize the effectiveness of this mode of operation, the electromechanical characteristics of each of the motors in pair of motors 1004 should be appropriately matched. This mode may be the default mode of operation of motorized scooter 100, or, in another embodiment of the present invention, only when motorized scooter 100 is moving at or above a particular speed. The modes of operation described herein may also be controlled and/or activated by the brake lever, the power lever, or other switches or levers.

Figure 14:
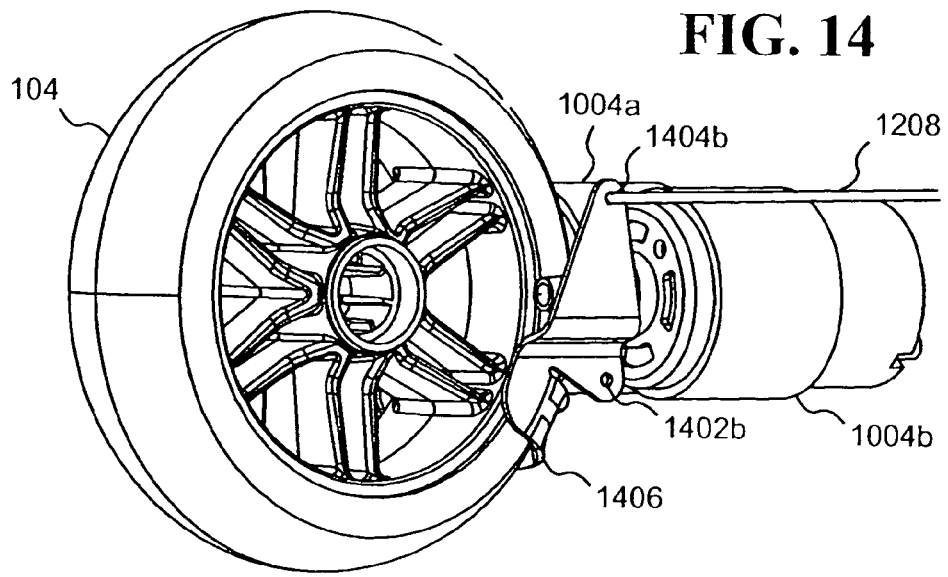
FIG. 14 is a close-up right rear perspective view of the drive system of FIG. 12.
Figure 15:
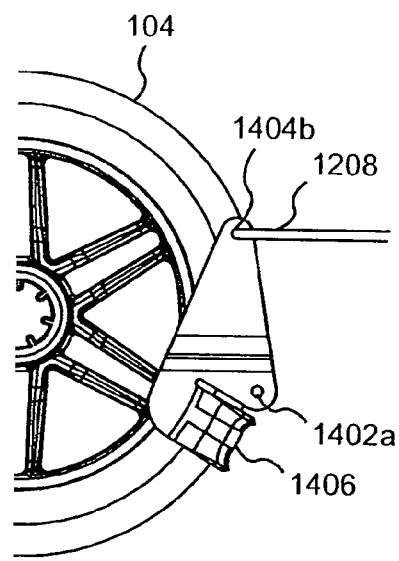
FIG. 15 is a right side elevational view of the braking system of the drive system of FIG. 12.
Figure 16:
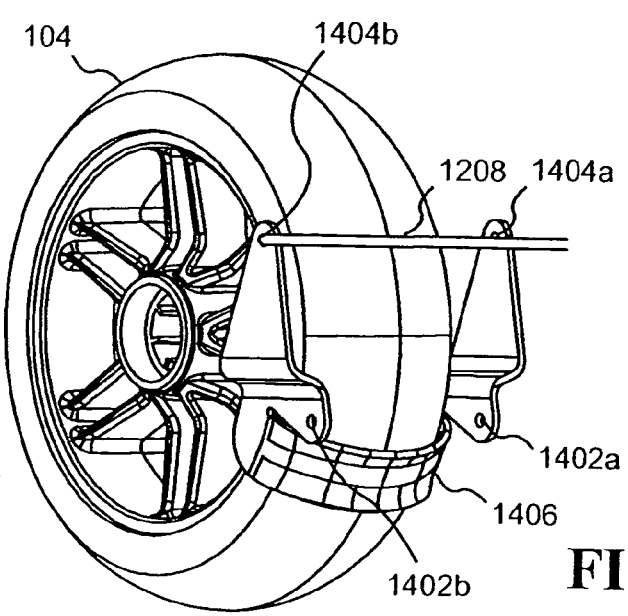
FIG. 16 is a close-up right front perspective view of the braking system of the drive system of FIG. 12.

FIGS. 14–16 are close-up right rear perspective, right side elevational, and close-up right front perspective views, respectively, of braking system 302 of motorized scooter 100. Brake system 302 is mounted on a set of brake mounting holes 1402 and includes a brake pad portion 1406 that is controllably engaged with rear wheel 104 through the user pivoting braking system 302 using a brake control cable 1208. Brake pad portion 1406 pivots around set of brake mounting holes 1402. Brake control cable 1208 is fixed in a brake control cable mounting hole 1404a. Braking system 302 operates as a friction brake, where the friction caused by brake pad portion 1406 contacting the tire surface of rear wheel 104 acts to dissipate the rotational energy of rear wheel 104 into heat. In another embodiment, as an alternative to being mounted to engage rear wheel 104, braking system 302 may instead be mounted to engage front wheel 102. In yet another embodiment, a second braking system similar to braking system 302 may also be mounted to engage front wheel 102.

FIGS. 17a–17d are right rear perspective, left rear perspective, front perspective, and top down views, respectively, of steering column clamp 502. Steering column clamp 502 includes an opening 1710 through which a stem of a handle bar (not shown) is inserted and then secured to steering column 118 through clamping forces. The clamping force is applied by screwing a pin through an opening 1702 that tightens a flange 1704. In another preferred embodiment, a compression (choker) collar (not shown) may be used to provide the clamping force. In this embodiment, the compression occurs as the collar is screwed onto a set of threads (not shown) on steering column 118. Further, set of indicators 504 may be integrated into throttle 124, which may contain the circuitry needed for interacting with circuit board 1006, as discussed herein.

Also integrated into steering column clamp 502 is a set of control cable pass-through openings 508. In one preferred embodiment, two control cables—a brake cable (not shown) and a power cable (not shown)—are used. The brake cable is used to operate brake system 302, as described herein, while the power cable is attached to throttle 124 used to control the power provided to pair of motors 1004 and regenerative braking for motorized scooter 100. Integrating set of control cable pass-through openings 508 for the control cables in steering column clamp provides for fewer parts and simpler construction of steering column head 502. In addition, set of control cable pass-through openings 508 provide cable management and protection, as a major portion of the control cables are protected in steering column 118 instead of being exposed.

Set of information indicators 504 is used to provide status information for motorized scooter 100. In one preferred embodiment, set of information indicators 504 includes a power indicator 1712a, indicating that power switch 110 is in the ON position; a charging indicator 1712b, indicating whether batteries 1002 are being charged in a normal or trickle fashion, or are fully charged; and a low power indicator 1712c, indicating that batteries 1002 are in a close to depleted state. In another preferred embodiment, other information that may be indicated includes over/under-speed, wheel/motor/drive system slippage, battery charge state, drive logic check, and microprocessor-controlled diagnostics.

Each information indicator may be implemented by one or more light emitting diodes (LED), including LED's that may produce one or more colors. For example, one type of LED is a dual color LED that emits a particular color based on the direction of bias of the voltage that is supplied to the terminals of the LED. Thus, when set of batteries 1002 are being charged, the terminals of the charging indicator LED may be biased in a first direction to produce a green color, and when batteries 1002 are fully charged, the charging indicator LED may be biased in a second direction to produce a red color. Other types of multi-color LED devices integrate multiple diodes into a single device, with a single terminal acting as a common ground and a separate terminal for each color. In this type of LED, multiple diodes may be activated simultaneously to produce a color. For example, a LED device that includes a red diode and a yellow diode can produce 3 colors: red, yellow and orange, with the orange color being produced when the red and yellow diodes are simultaneously powered.

Figure 17A:
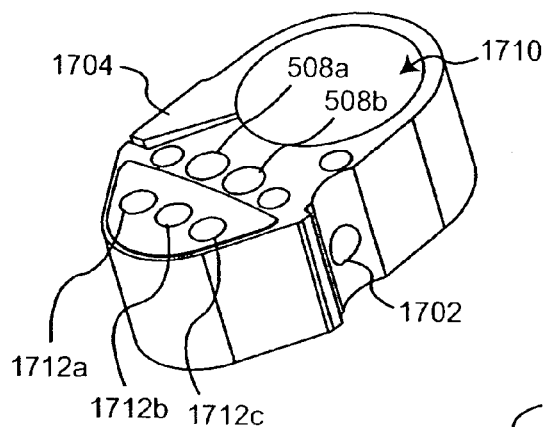
FIGS. 17a–e are several views of a steering column clamp and steering column configured in accordance with one embodiment of the present invention for use in motorized scooter of FIG. 1.
Figure 17B:
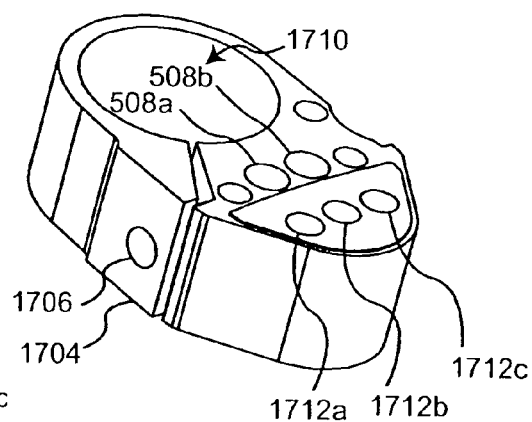
Figure 17C:
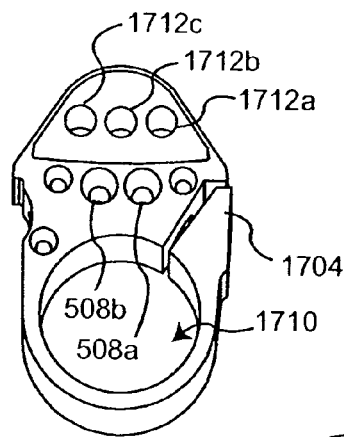
Figure 17D:
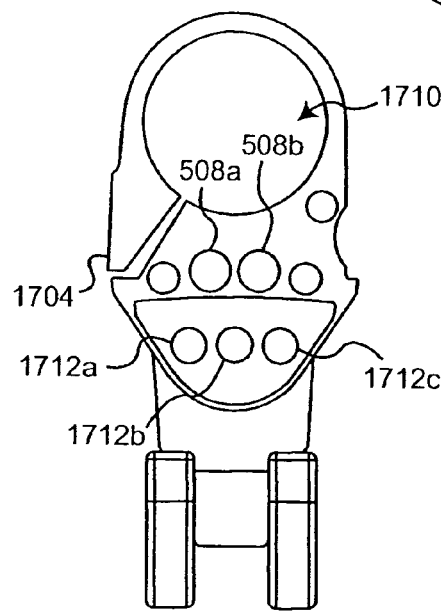
Figure 17E:
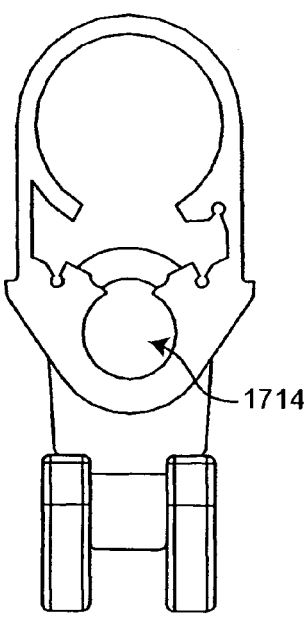

FIG. 17e is a cross sectional view of steering column 118, and includes a top plan view of a part of the steering portion of steering and hinge system 112. In one preferred embodiment, steering column 118 includes a cable guide opening 1714 into which the brake and power cables, along with the wires necessary to operate set of information indicators 506, are retained.

Figure 18:
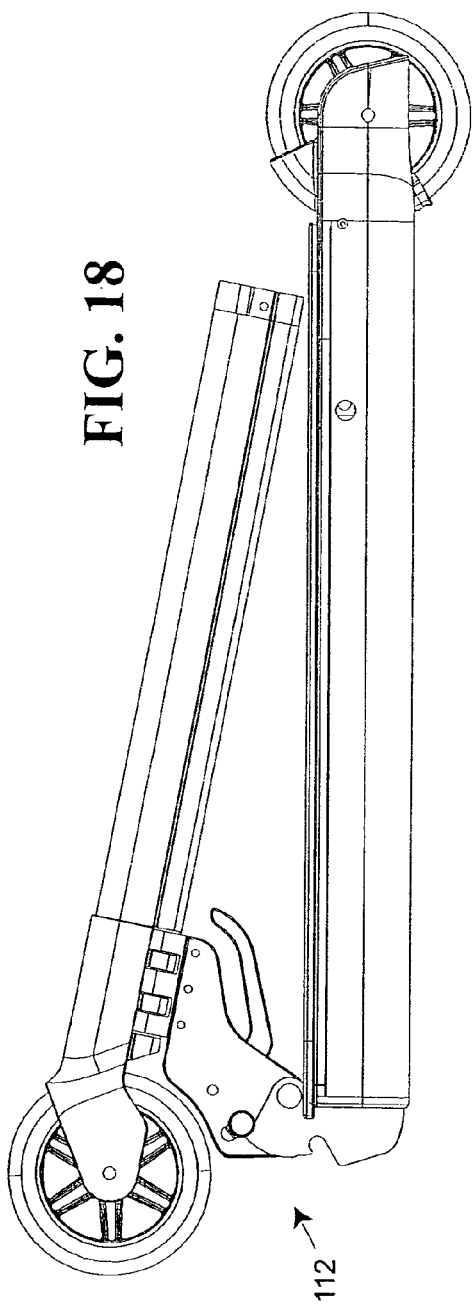
FIG. 18 is a side elevation view of the motorized scooter of FIG. 1 in a folded position.
Figure 20:
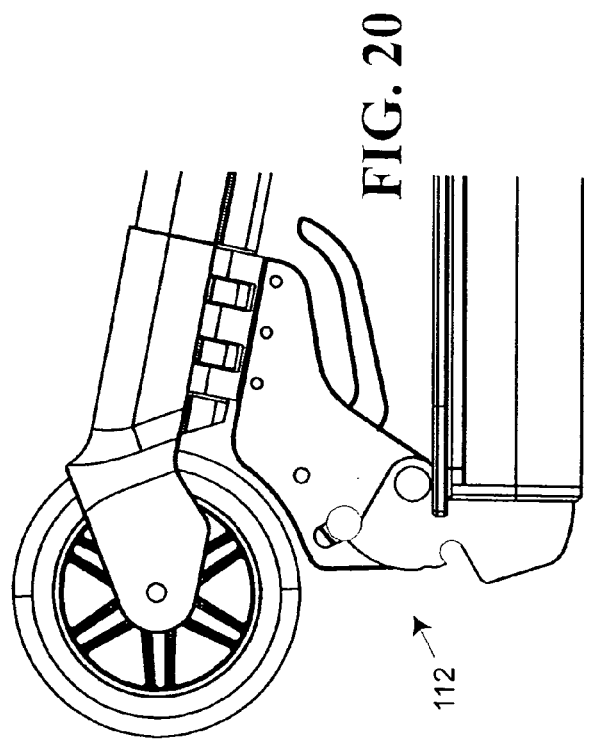
FIG. 20 is a close-up left elevational view of the steering and hinge system of FIG. 18 in the folded position.

FIGS. 18 and 20 are views of motorized scooter 100, with a close-up side elevation view of the hinge portion of steering and hinge system 112, after motorized scooter 100 has been placed in the folded configuration. Motorized scooter 100 may be placed in a folded configuration to provide for storage or shipping.

Figure 19:
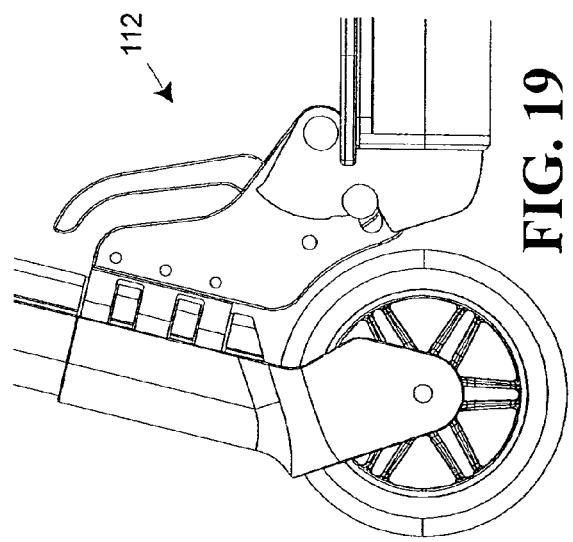
FIG. 19 is a close-up left elevational view of a steering and hinge system configured in accordance with one embodiment of the present invention for use with the motorized scooter of FIG. 1.

FIGS. 19 and 21 are a close-up side elevation and a right rear perspective views of the hinge portion of steering and hinge system 112 when motorized scooter 100 is in an unfolded configuration. As illustrated in the figures, the steering hinge portion in steering and hinge system 112 that attaches the steering column assembly is not directly connected to fuselage 108 of motorized scooter 100. Instead, it is connected to a lockable joint that allows motorized scooter 100 to be folded. As discussed below, the lockable joint of steering and hinge system 112 is created using a multilayered construction.

Figure 24:
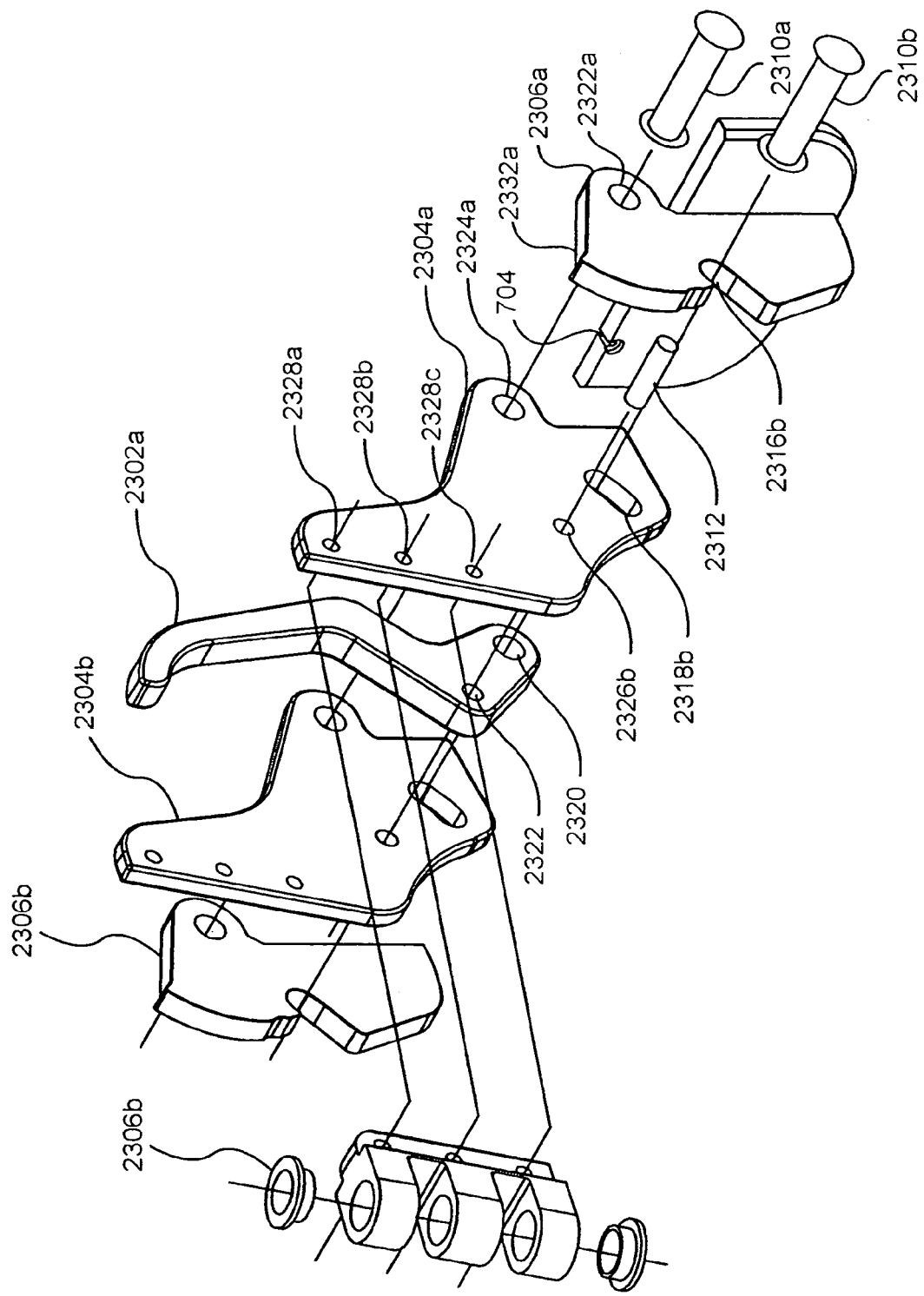
FIG. 24 is an exploded close-up left front perspective view detailing the hinge portion of the steering and hinge system of FIG. 18.

FIGS. 22–24 are detailed views of steering and hinge system 112, including a lever 2302, a pair of head stock brackets 2304, and a pair of pivot brackets 2306. Steering column 118 is attached to pair of head stock brackets 2304 through the use of a steering column mount 2308, with steering column mount 2308 coupled to a set of pins (not shown) inserted into a set of attachment holes 2334 and 2328 in steering column mount 2308 and pair of head stock brackets 2304, respectively. Steering column 118 is attached to steering column mount 2308 through a kingpin or hinge-pin. In one preferred embodiment, the pin is hollow to allow for the throttle cable (not shown) to pass through. A pair of bushings 2314 is placed on the top and bottom portions of steering column mount 2308 and act as anti-friction plain bearings against the axial and radial loads of the steering column.

Pair of head stock brackets 2304 mounted to pair of pivot brackets 2306 through the use of a pair of pivot pins 2310. Pivot pin 2310a in located in a pair of pivot bracket pivot holes 2322 and a pair of head stock bracket pivot holes 2324. Pivot pin 2310b is displaced in a pair of pivot bracket notches 2316, a pair of head stock bracket slots 2318, and a lever hole 2320. Both pins of pair of pivot pins 2310 contain a head portion that retains the pins in the holes and also secures the sandwiched construction of steering and hinge system 112. A lever pivot pin 2312 is inserted into a pair of head stock bracket lever pivot holes 2326 and a lever pivot hole 2322, retaining lever 2302.

The configuration of pair of head stock bracket slots 2318 controls the amount of rotation allowed for lever 2302, such that when lever 2302 is pulled, the ends of pair of head stock bracket slots 2318 closest to front wheel 102 stop the rotation of lever 2302 and allow steering column 118 to pivot around the axis defined by the long axis of pivot pin 2310a. Conversely, when motorized scooter 100 is in an unfolded configuration, pivot pin 2316b rests against the ends of pair of head stock bracket slots 2318 closest to fuselage 108. Further, in this position, lever 2302 is held in place by pair of pivot bracket notches 2316. A spring (not shown) is used to bias lever 2302.

Figure 25:
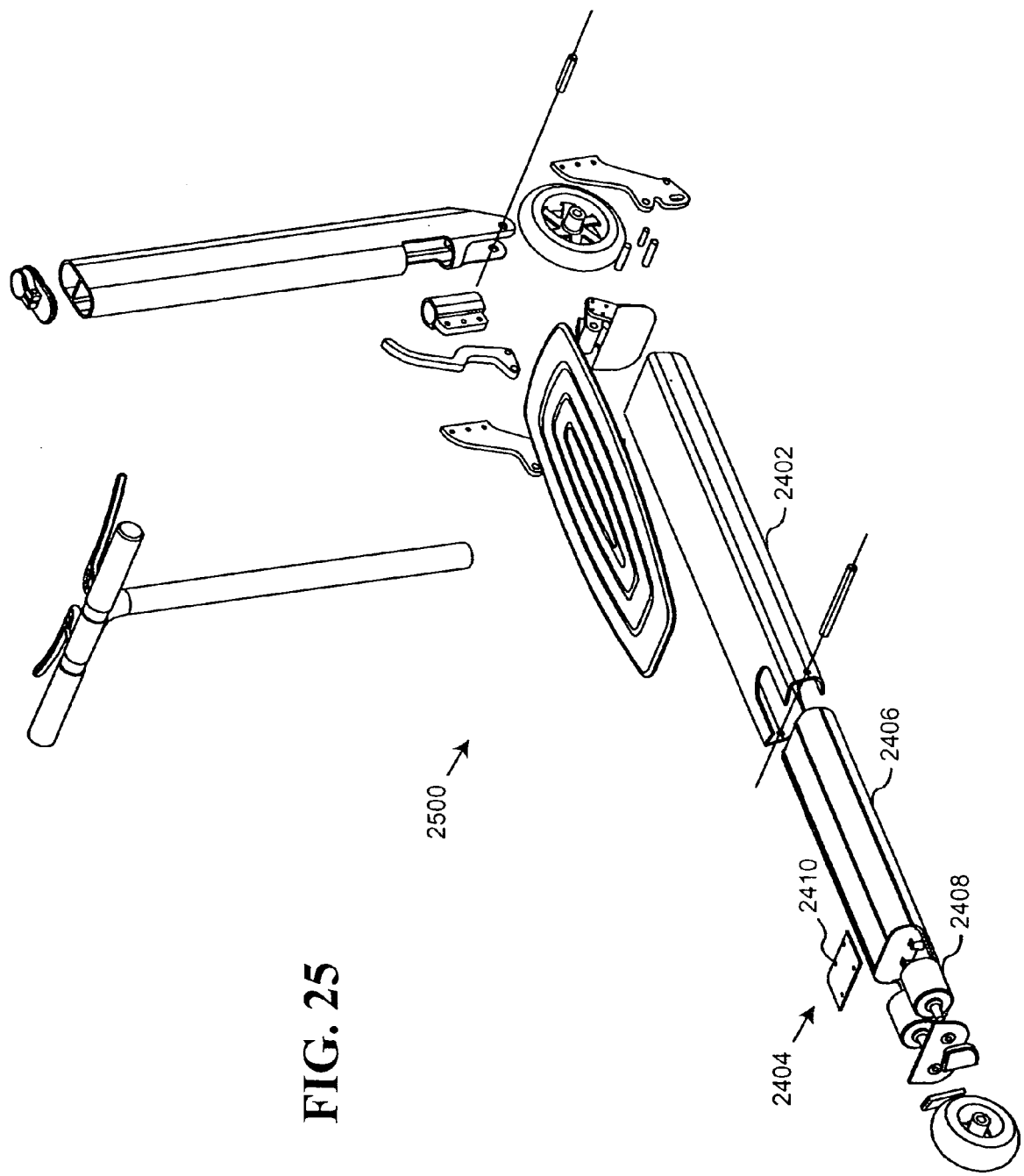
FIG. 25 is an exploded right rear perspective view of a second motorized scooter configured in accordance with one embodiment of the present invention.
Figure 29A:
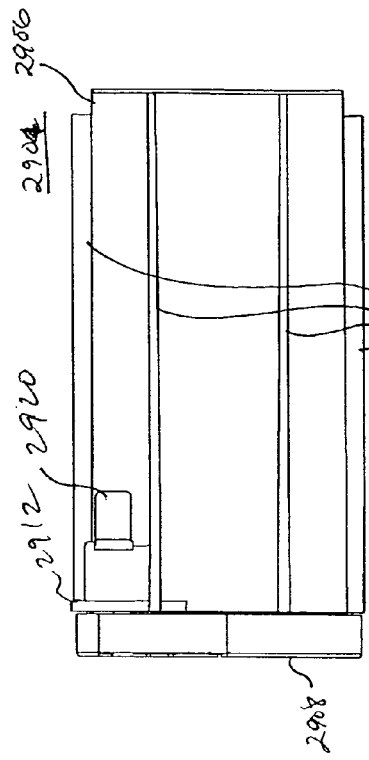
FIGS. 29a–i are right elevation, left elevation, right rear perspective, left front perspective, bottom plan, top plan, front elevation, and rear elevation perspective views, respectively, of a battery module and a perspective view of a battery system containing multiple battery modules configured in accordance with one embodiment of the present invention.
Figure 29B:
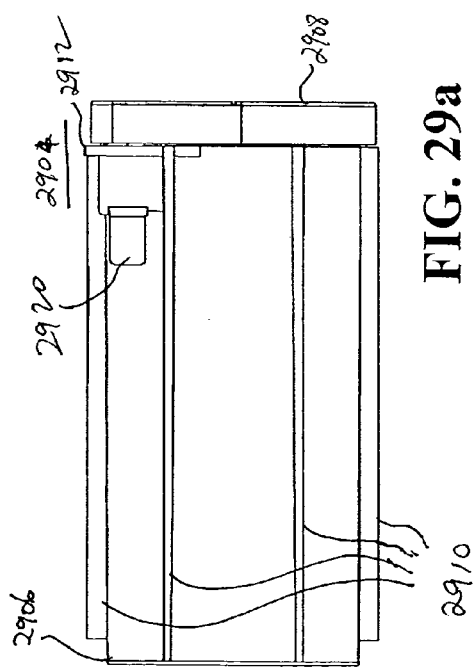
Figure 29C:
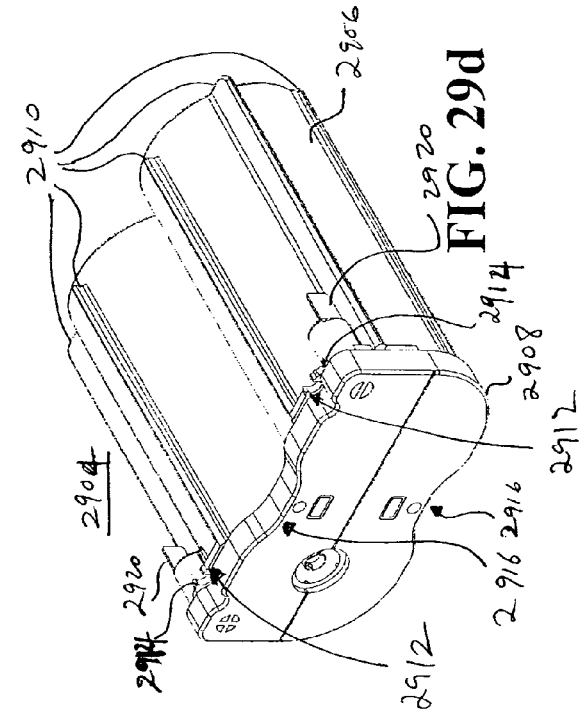
Figure 29D:
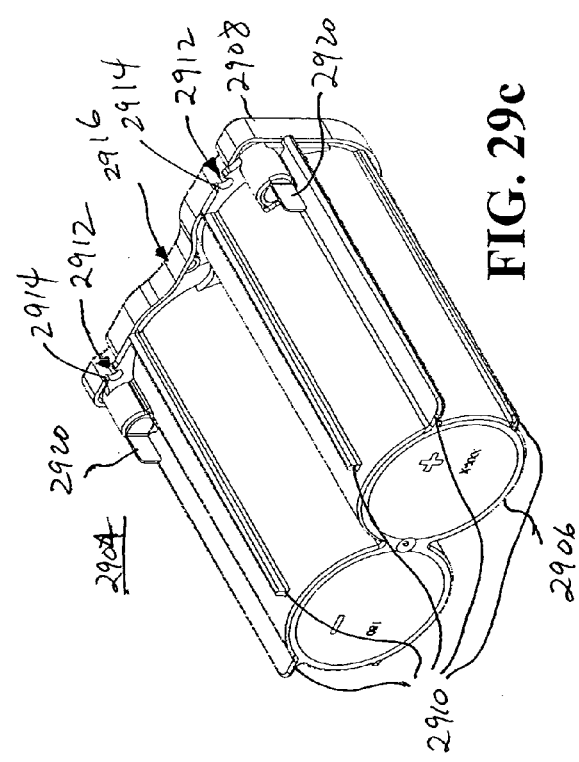
Figure 29E:
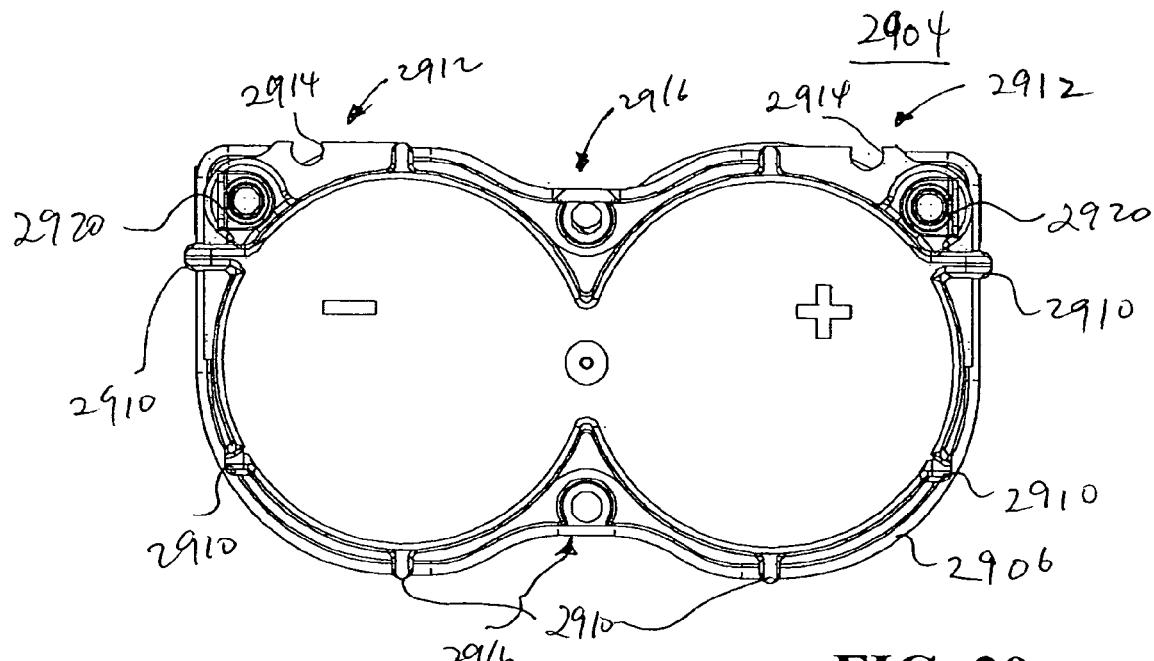
Figure 29F:
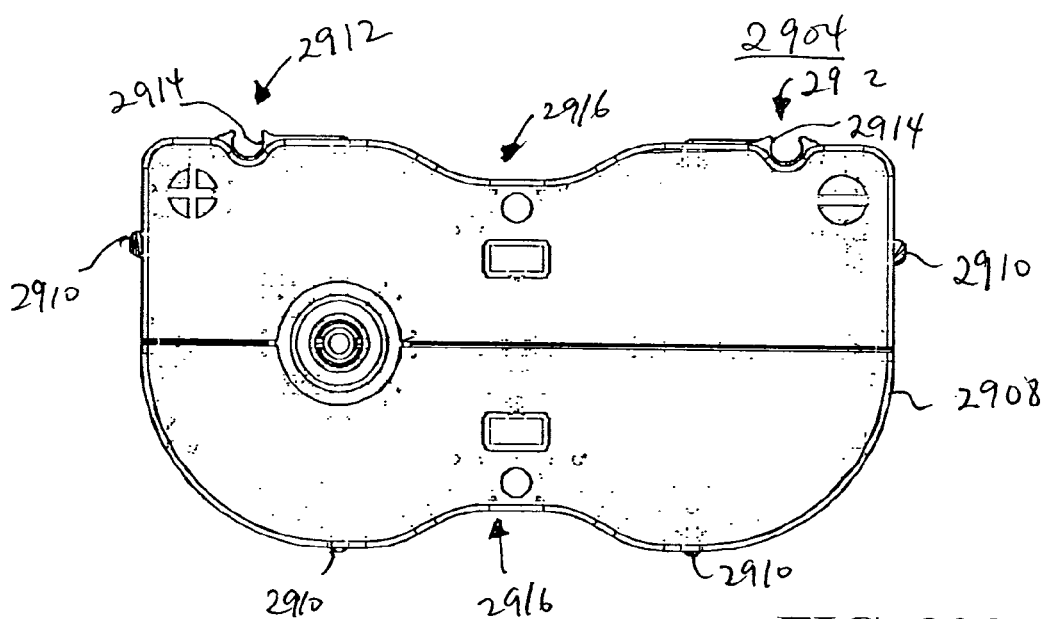
Figure 29H:
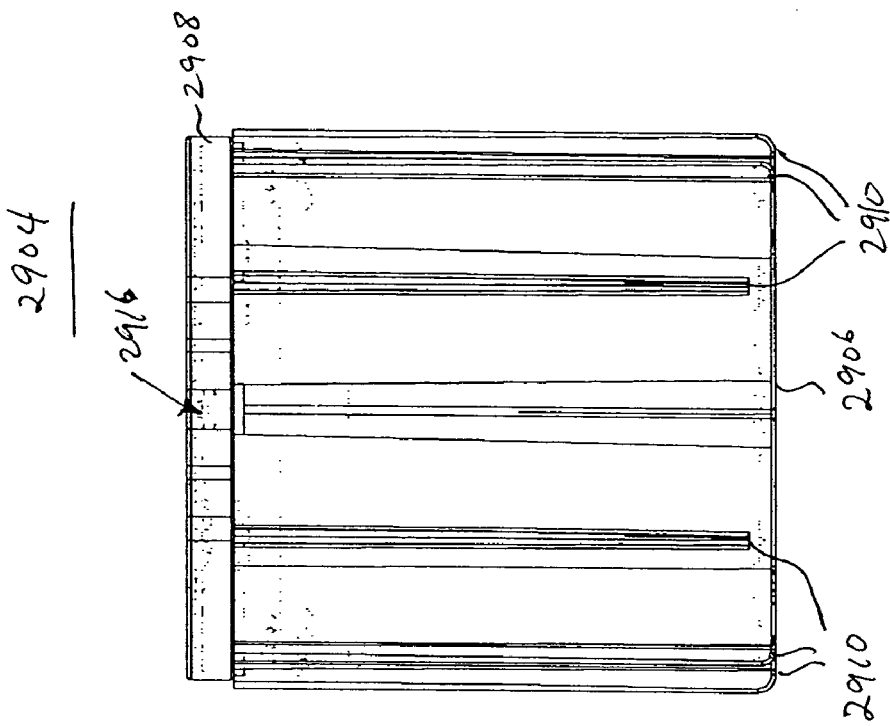
Figure 29G:
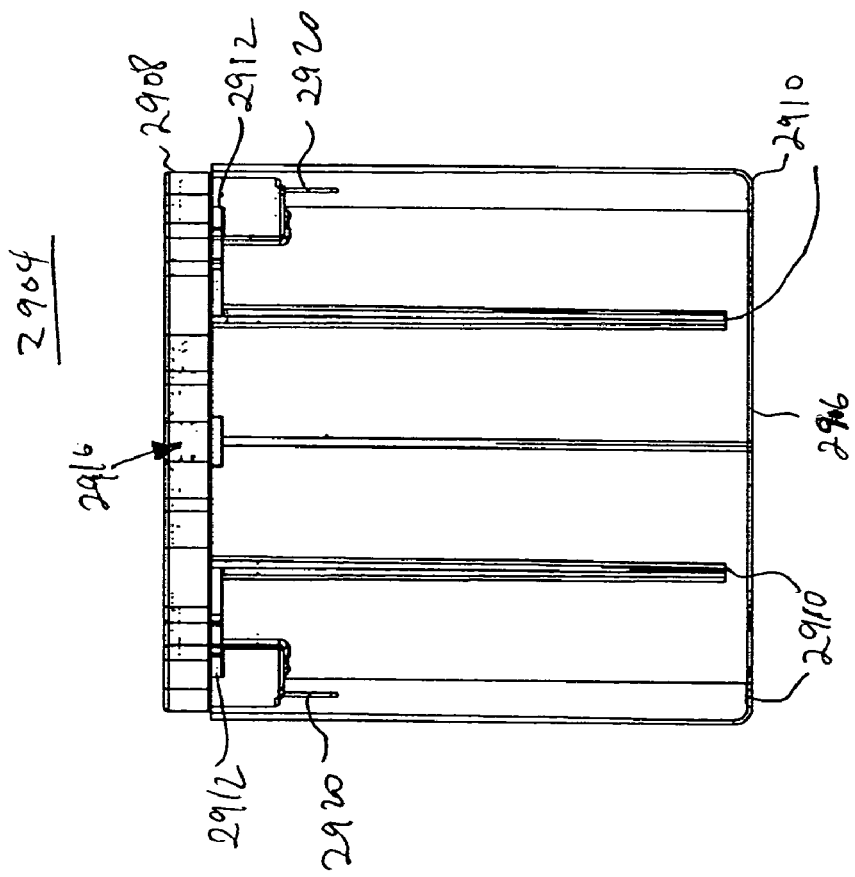
Figure 29I:
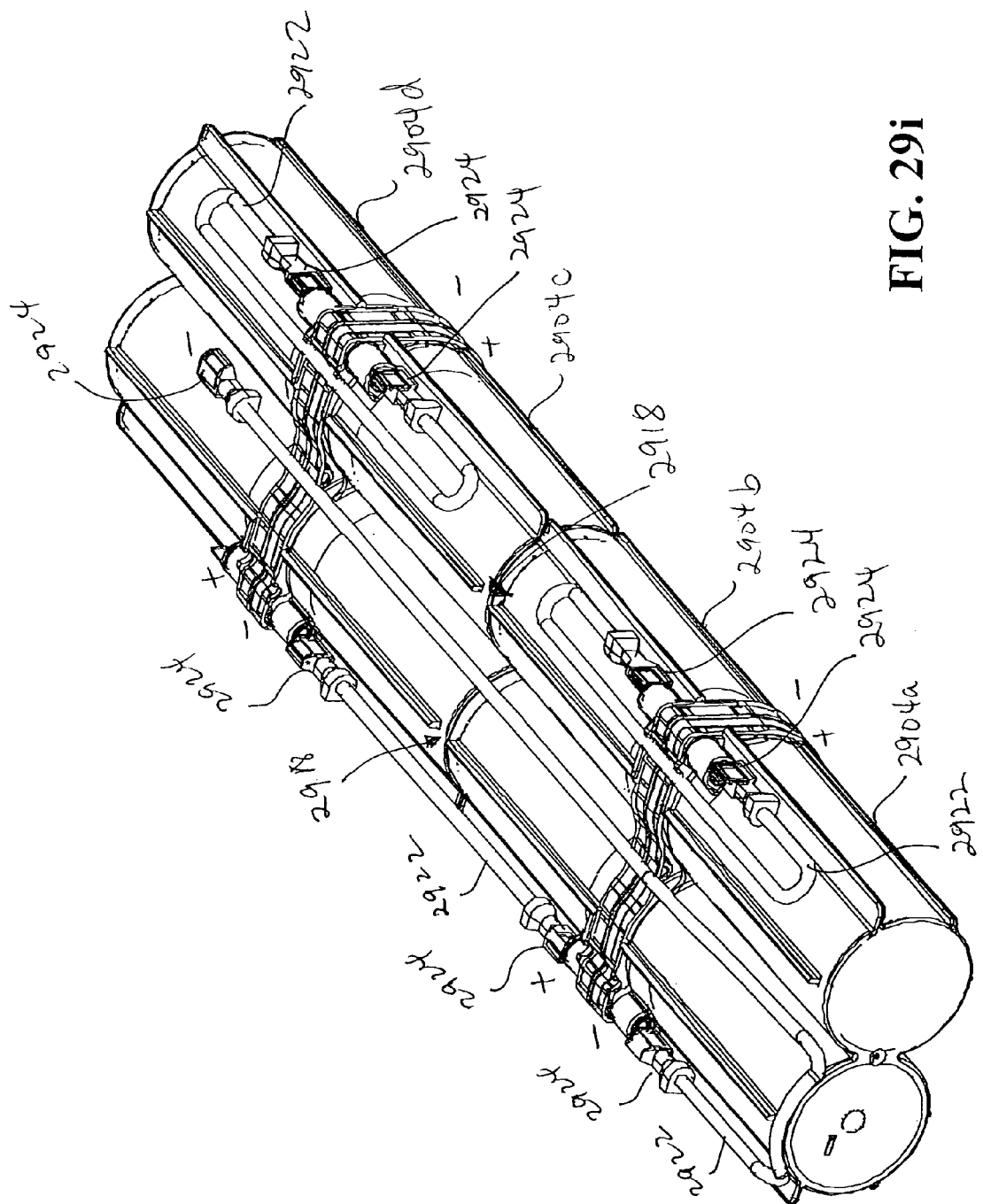

As discussed herein, one unique feature of the present invention is that no external motor is mounted above the body/deck of the scooter. Instead, pair of motors 1004 and batteries 1002 is integrated into fuselage 108 of motorized scooter 100. In this embodiment, an open top fuselage is used to hold the battery/motor assembly. In another preferred embodiment, as shown in FIG. 25, a motorized scooter 2500 includes a fuselage extrusion 2402 into which a battery/motor assembly 2404 is inserted. Battery/motor assembly 2404 includes a battery and frame 2406, a motor assembly 2408, and a circuit board assembly 2410. Using a one piece extrusion for fuselage extrusion 2402 allows for easier assembly as battery/motor assembly 2404 can be pre-assembled, as described below, and is inserted into fuselage extrusion 2402 in one single step.

FIGS. 26a–d are various views illustrating the construction of battery/motor assembly 2404, where circuit board assembly 2410 is first mounted to battery and frame 2406 in FIG. 26b. Then, motor assembly 2408 is mounted to the battery and frame 2406 before the completed construction is placed into fuselage extrusion 2402. Battery/motor assembly 2404 provides for easier replacement of the main components of motorized scooter 2500.

FIGS. 27a–27c illustrate a dynamic transmission system 2700 configured in accordance with one embodiment of the present invention that may be used with motorized scooter 100 or motorized scooter 2500. Dynamic transmission system 2700 includes an operator-controlled mechanism 2704 to engage/disengage a pair motors 2716 to allow freewheeling of a wheel 2718. In one embodiment, dynamic transmission system 2700 is always in an "engaged mode," with a pair of drive cones 2720 on pair of motors 2716 motors always in contact with wheel 2718 and allows the drive system to be engaged as a default. Thus, the drive system is disengageable by the operator when the battery is drained or if the operator wishes to freewheel. In another embodiment, dynamic transmission system 2700 is always in a "disengaged" mode, which allows the operator to freewheel the scooter without the drive system engaged and only use the drive system when the operator deems it necessary.

In one preferred embodiment of the present invention, dynamic transmission system 2700 is configured using a pulley system 2722 coupled to a control assembly 2702. Control assembly 2702 includes a first stopper 2708 and a second stopper 2714 that controls the pivoting of pulley system 2722, which is mounted to pair of motors 2716 through the use of a pair of motor jackets 2706. A spring 2704 biases the control assembly 2702 to return the system to a first state when no force is being applied to control assembly 2702. In one preferred embodiment of the present invention, pair of motors 2716 are switched on automatically by control assembly 2702 when they are brought together. In another embodiment, a separate on/off switch is used to allow pair of motors 2716 to be switched on separately by the user.

In the configuration where the motors are always engaged, a manual disengagement system may be provided to separate pair of motors 2716 and thus disengage pair of drive cones 2720 from wheel 2718. In this embodiment, the user has to stop and manually disengage pair of motors 2716 from wheel 2718. The position of pair of motors 2716 may be controlled through the use of a ratchet system in one embodiment, or, pair of motors 2716 may be held together by springs normally and a wedge mechanism is used to push them apart.

Referring to FIGS. 28a–b, which are bottom and front left perspective views, respectively, illustrating a tachometer system 2800 that includes a tachometer disk 2802 and a detector 2804. Tachometer disk 2802 is coupled to a shaft 2806 of motor 1004a and located in an opening 2808 in circuit board 1006. Detector 2804 is mounted to circuit board 1006 on one edge of opening 2808 so that a portion of tachometer disk 2802 passes through a slot in detector 2804.

In one embodiment, tachometer system 2800 is an incremental encoder system. Specifically, tachometer disk 2802 contains a set of openings (slits) surrounding its center so that, as tachometer disk 2802 rotates, alternating slits pass through a light path generated by an LED (i.e., tachometer disk 2802 is a "chopper disk" that has slits molded into it which "chops" the light beam from the LED as the disk rotates). A photodetector and encoder is placed opposite to the LED to detect when the light is broken by tachometer disk 2802 and determine the speed and direction of rotation of tachometer disk 2802. In one preferred embodiment, the photodetector and encoder are contained in an integrated optical encoder. As tachometer disk 2802 is coupled directly to shaft 2806 of motor 1004a, tachometer system 2800 detects the rotation of shaft 2806 to determine the position, and rotation speed and acceleration of motor 1004a. From this information, many features may be provided. As discussed above, the speed of scooter 100 may be determined and used for more efficient operation of the system. For example, the drive system of scooter 100 may be operational only when the detected speed of scooter 100 is above a certain level. In one preferred embodiment, the detected speed of scooter 100 must be above approximately 2 mph to enable electric drive. In a more preferred embodiment, the detected speed must be above approximately 3 miles per hour to enable electric drive. In addition, in one embodiment, the system will deactivate the drive if the detected speed falls below the respective levels noted above. In another example, acceleration may be determined by calculating the change of the rotation speed of tachometer disk 2804 over time. If the detected acceleration exceeds a predetermined amount, this indicates a loss of traction somewhere in the system.

It should be noted that any tachometer system could be used to determine the operating parameters of motor 1004a. In addition, in another embodiment, tachometer system 2800 may include two tachometer disks, one for each of the motors in pair of motors 1004. Moreover, in another embodiment, measured fluctuations in the voltage or amperage of each motor of pair of motor 1004 may also be used to determine the position, speed and acceleration of each motor of pair of motors 1004.

FIGS. 29a–i illustrate a battery system 2900 that may be used in place of set of battery 1002. Battery system 2900 is created from using a set of battery modules, each identical to a battery module 2904, each of which includes a dual cylinder body 2906. In one preferred embodiment, each cylinder in dual cylinder body 2906 holds the battery components for one cell, including the positive and negative plates, and plate separator (not shown), which are attached to a pair of contacts 2920. Battery module 2904 also includes a cap 2908 that covers both cylindrical portions of dual cylinder body 2906 and integrates a non-spillable vent system. Battery module 2904 is also configured with a set of ribs 2910 and a set of flanges 2912 on dual cylinder body 2906. As discussed further herein, dual cylinder body 2906, cap 2908, set of ribs 2910 and set of flanges 2912 are configured to provide passage space/clearance between the cylindrical cells for a variety of components, such as power/battery wires, throttle wires, cables and other items, as well as using the area to provide space and alignment for a "strap" that holds all the battery modules together. Further, symmetry should be maintained in the above features so that multiple battery modules 2904 will align and work correctly when placed top-to-top or bottom-to-bottom.

In one preferred embodiment, battery system 2900 includes four battery modules 2904a–d placed in the following configuration: bottom/top to top/bottom to bottom/top to top/bottom, where the "top" portion represents the portion of each battery module where the cap is located, and the "bottom" portion is the base of each module opposite the end from the cap. Each battery module supplies 4 volts of electricity, with an aggregate total of 16 volts for all four modules as wired in series by use of a set of wires 2922 and contact clips 2924 that attaches to the contacts of each module. This configuration optimizes space, weight, cost, and termination due to wiring concerns as it allows the use of the shortest wire runs to limit resistive loss for any gauge wires. For example, longer wire runs require larger diameter wires, which consequently require larger terminals. These larger terminals would require more space. It should be noted that in other embodiments, multiple battery modules 2904 may be used in any numbers, although it is preferable that an even number be used for the considerations described above.

In one preferred embodiment, at least one rib in set of ribs 2910 is shorter than the length of the body of battery module 2904 to provide space for wires to crossover. In one implementation, a rib is shortened on one surface of battery module 2904 to terminate farther from the bottom of the battery module. Thus, where two battery modules are placed bottom to bottom, a gap 2918 is formed to allow wires to pass through. In another preferred embodiment, a gap may be placed anywhere along the rib such that the gap does not have to be positioned at the bottom of the battery module. In yet another embodiment, a hole is placed in the rib itself such that as much structural integrity is maintained in the rib as possible while allowing cable pass-thru.

In one preferred embodiment, the configuration of set of ribs 2910 and set of flanges 2912 are shaped so that battery system 2900 fits into and is supported by the interior of fuselage 108. Specifically, set of ribs 2910 and flanges 2912, as well as cap 2908 is configured such that battery system 2900 fits into the rounded interior of fuselage 108, which matches the use of the rounded corners of fuselage 108 to save cost and weight added by additional materials. As discussed above, the rounded corners of fuselage 108 improves cornering and ground clearance. Use of set of ribs 2910 and set of flanges 2912 eliminates the need for a solid body of plastic for support of battery system 2900, which eliminates excess weight and materials. In addition, use of set of ribs 2910 and set of flanges 2912 provides for clear spaces between battery system 2900 and the interior of fuselage 108 so that wires or cables may pass along the length of fuselage 108.

Set of flanges 2912 includes a set of wire grippers 2914 to retain the electrical wires used in wiring the battery modules in set of battery modules 2902 together. Cap 2908 also includes a clearance depression 2916 that is adjacent to and functions with set of wire grippers 2914 to secure passage of wires. Use of set of wire grippers 2914 and clearance depression 2916 to control the placement and retention of wires help to create a low profile battery system with wires that are secured from detachment. In one preferred embodiment, set of wire grippers 2914 are placed on dual cylinder body 2906 instead of cap 2908. This allows the grippers of adjacent battery modules to be separated by the thickness of two of the caps instead of the grippers being flush or touching each other, as the latter configuration might create a configuration where the grippers act like the blades of a scissor to bind or apply shear to the wire held in the grippers when the battery modules shift. In another embodiment, where the battery modules are completely secured together, set of wire grippers 2914 may be placed next to each other.

The embodiments described above are exemplary embodiments of a scooter configured in accordance with the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A scooter comprising:
   a fuselage having a front portion and a rear portion;
   a rear wheel rotatably mounted at the rear portion of the fuselage;
   a standing platform supported by the fuselage for supporting a rider; and,
   a transmission system mounted under the standing platform in the rear portion of the fuselage comprising a first motor with a wheel engagement element being operatively coupled with the rear wheel to allow the wheel engagement element to rotate the rear wheel when the wheel engagement element is engaged with the rear wheel;
   where the first motor includes a shaft having a first end and a second end, wherein the wheel engagement element is mounted on the first end and a tachometer system is mounted on the second end.

2. The scooter of claim 1, where the first motor includes a shaft, and where the first motor is mounted so that the shaft is parallel with a longitudinal axis running from the front portion to the rear portion of the fuselage.

3. The scooter of claim 1, where the rear wheel includes a sidewall and the wheel engagement element is shaped to engage the sidewall.

4. The scooter of claim 1, where the rear wheel includes a sidewall and the wheel engagement element is a cone.

5. The scooter of claim 1, further comprising a battery system mounted in the fuselage under the standing platform.

6. The scooter of claim 5, wherein the fuselage comprises a floor pan portion with a shape and the battery system comprises a battery shaped to conform to the shape of the floor pan.

7. The scooter of claim 1, where the fuselage has a U-shaped cross-section.

8. The scooter of claim 1, where the fuselage is tubular in shape.

9. The scooter of claim 1, where the transmission system further comprises a second motor with a second wheel engagement element mounted in parallel to the first motor and operatively coupled with the rear wheel to allow the second wheel engagement element to rotate the rear wheel when the second wheel engagement element is engaged with the rear wheel.

10. The scooter of claim 9, where the rear wheel includes a sidewall and the second wheel engagement element is shaped to engage the sidewall.

11. The scooter of claim 1, where the transmission system further comprises a hinged mechanism to control the contact between the wheel engagement element and the wheel.

12. The scooter of claim 11, where the hinged mechanism is operable by a cable to control the contact between the wheel engagement element and the wheel.

13. The scooter of claim 11, where the hinged mechanism is normally in a state that allows the wheel engagement element to be engaged with the rear wheel.

14. The scooter of claim 11, where the hinged mechanism is normally in a state that allows the wheel engagement element to be disengaged with the rear wheel.

15. The scooter of claim 1, wherein the tachometer system comprises a tachometer disk mounted on the second end of the shaft of the first motor.

16. The scooter of claim 15, wherein the tachometer disk includes a plurality of openings displaced around the second end of the shaft of the first motor.

17. The scooter of claim 1, wherein the tachometer system comprises an optical encoder mounted on the second end of the shaft of the first motor to determine a rotation of the shaft of the first motor.

* * * * *